US012682714B2

(12) United States Patent
Otani et al.

(10) Patent No.: US 12,682,714 B2
(45) Date of Patent: Jul. 14, 2026

(54) SERVER DEVICE, SYSTEM, METHOD FOR CONTROLLING SERVER DEVICE, AND STORAGE MEDIUM

(71) Applicant: NEC Corporation, Tokyo (JP)

(72) Inventors: Takumi Otani, Tokyo (JP); Takeshi Sasamoto, Tokyo (JP); Junichi Inoue, Tokyo (JP); Atsushi Ikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 367 days.

(21) Appl. No.: 18/025,320

(22) PCT Filed: Sep. 11, 2020

(86) PCT No.: PCT/JP2020/034514
§ 371 (c)(1),
(2) Date: Mar. 8, 2023

(87) PCT Pub. No.: WO2022/054238
PCT Pub. Date: Mar. 17, 2022

(65) Prior Publication Data
US 2024/0029494 A1 Jan. 25, 2024

(51) Int. Cl.
*G07C 9/37* (2020.01)
*G06V 40/16* (2022.01)

(52) U.S. Cl.
CPC ............. *G07C 9/37* (2020.01); *G06V 40/172* (2022.01)

(58) Field of Classification Search
CPC .... G06Q 50/26; G06V 10/761; G06V 40/172; G07B 15/00; G07C 9/257; G07C 9/27; G07C 9/37; G07C 9/38
See application file for complete search history.

(56) References Cited

U.S. PATENT DOCUMENTS

| | | | |
|---|---|---|---|
| 2010/0148922 A1 | 6/2010 | Yamada et al. | |
| 2018/0239954 A1 | 8/2018 | Hamada | |
| 2020/0074152 A1* | 3/2020 | Nakamura | G06V 20/52 |

FOREIGN PATENT DOCUMENTS

| | | |
|---|---|---|
| JP | 2002-099682 A | 4/2002 |
| JP | 2006-092491 A | 4/2006 |

(Continued)

OTHER PUBLICATIONS

A machine translated English version of document WO2019/138839 (Year: 2019).*

(Continued)

*Primary Examiner* — Ruiping Li
(74) *Attorney, Agent, or Firm* — Sughrue Mion, PLLC

(57) ABSTRACT

Provided is a server device with which it is possible to detect the occurrence of false authentication in biometric authentication. The server device is provided with an acquisition unit and an authentication unit. The acquisition unit acquires biometric information regarding an authenticate from a terminal. The authentication unit performs biometric authentication using the biometric information regarding the authenticate and biometric information regarding each of a plurality of users registered in advance. When a prescribed condition is satisfied, the authentication unit transmits, to a staff terminal used by staff, authentication result information including the biometric information acquired from the terminal and registered biometric information of a successful authenticate who succeeded in biometric authentication.

16 Claims, 19 Drawing Sheets

BOARDING PROCEDURE SYSTEM

(56)         References Cited

FOREIGN PATENT DOCUMENTS

| | | | |
|---|---|---|---|
| JP | 2007-272810 | A | 10/2007 |
| JP | 2008-257329 | A | 10/2008 |
| JP | 2009-015797 | A | 1/2009 |
| JP | 2010-146073 | A | 7/2010 |
| JP | 2012-208610 | A | 10/2012 |
| JP | 2017-167754 | A | 9/2017 |
| JP | 2019-125237 | A | 7/2019 |
| JP | 2020-030669 | A | 2/2020 |
| JP | 2020-036211 | A | 3/2020 |
| JP | 7279772 | B2 | 5/2023 |
| WO | 2017/043132 | A1 | 3/2017 |
| WO | WO2019/138839 | * | 7/2019 |
| WO | WO-2019138839 | A1 * | 7/2019 ......... G06K 9/00255 |

OTHER PUBLICATIONS

International Search Report for PCT Application No. PCT/JP2020/034514, mailed on Dec. 8, 2020.
English translation of Written opinion for PCT Application No. PCT/JP2020/034514, mailed on Dec. 8, 2020.
JP Office Action for JP Application No. 2021-211839, mailed on Nov. 22, 2022 with English Translation.
JP Office Action for JP Application No. 2023-078283, mailed on May 7, 2024 with English Translation.
JP Office Action for JP Application No. 2021-211839, mailed on Apr. 11, 2023 with English Translation.

* cited by examiner

Fig.2

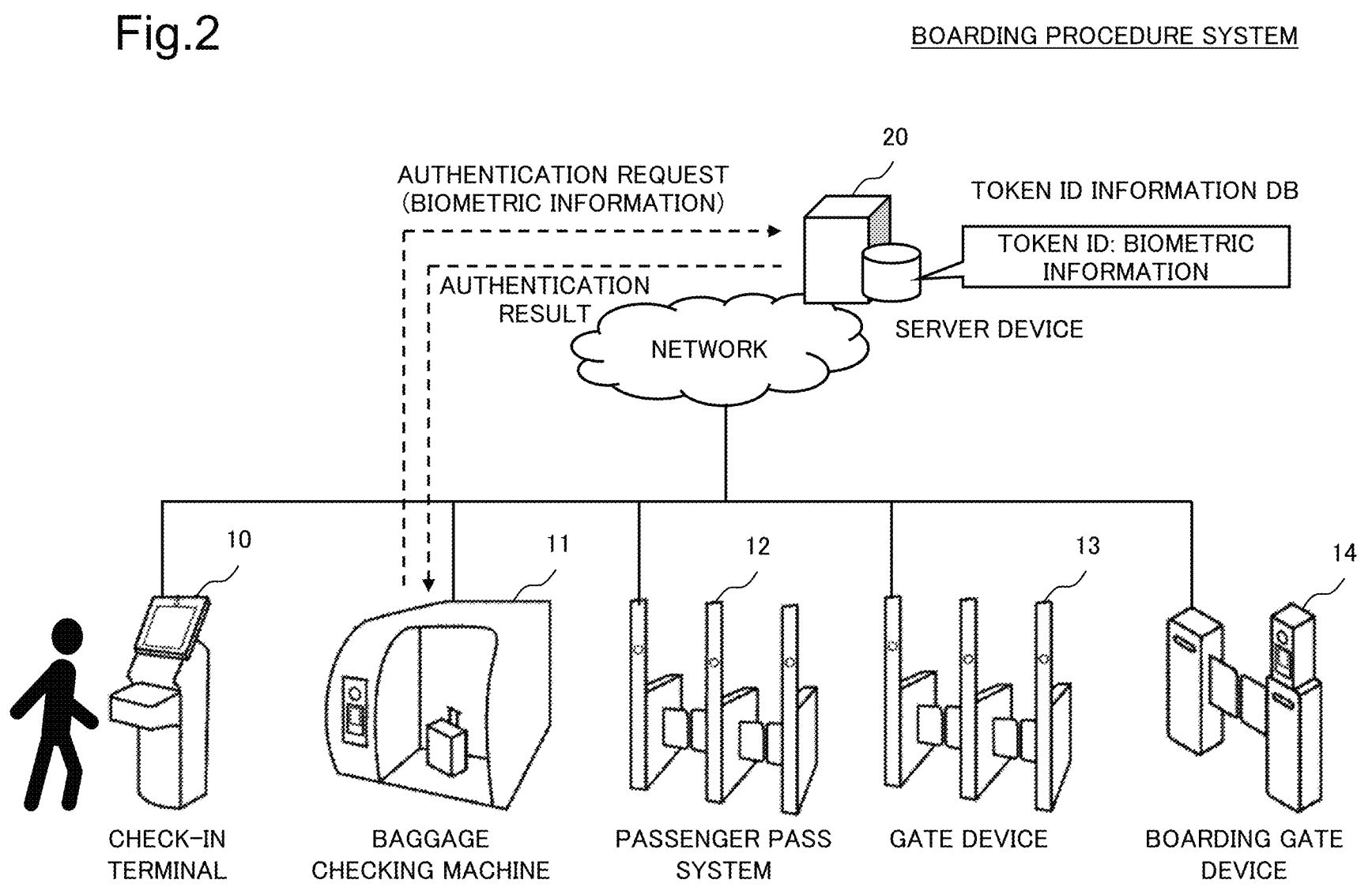

BOARDING PROCEDURE SYSTEM

TOKEN ID INFORMATION DB

TOKEN ID: BIOMETRIC INFORMATION

SERVER DEVICE

20

AUTHENTICATION REQUEST (BIOMETRIC INFORMATION)

AUTHENTICATION RESULT

NETWORK

CHECK-IN TERMINAL

10

BAGGAGE CHECKING MACHINE

11

PASSENGER PASS SYSTEM

12

GATE DEVICE

13

BOARDING GATE DEVICE

AUTHENTICATION REQUEST

| TERMINAL IDENTIFIER | BIOMETRIC INFORMATION | ... |

Fig.10

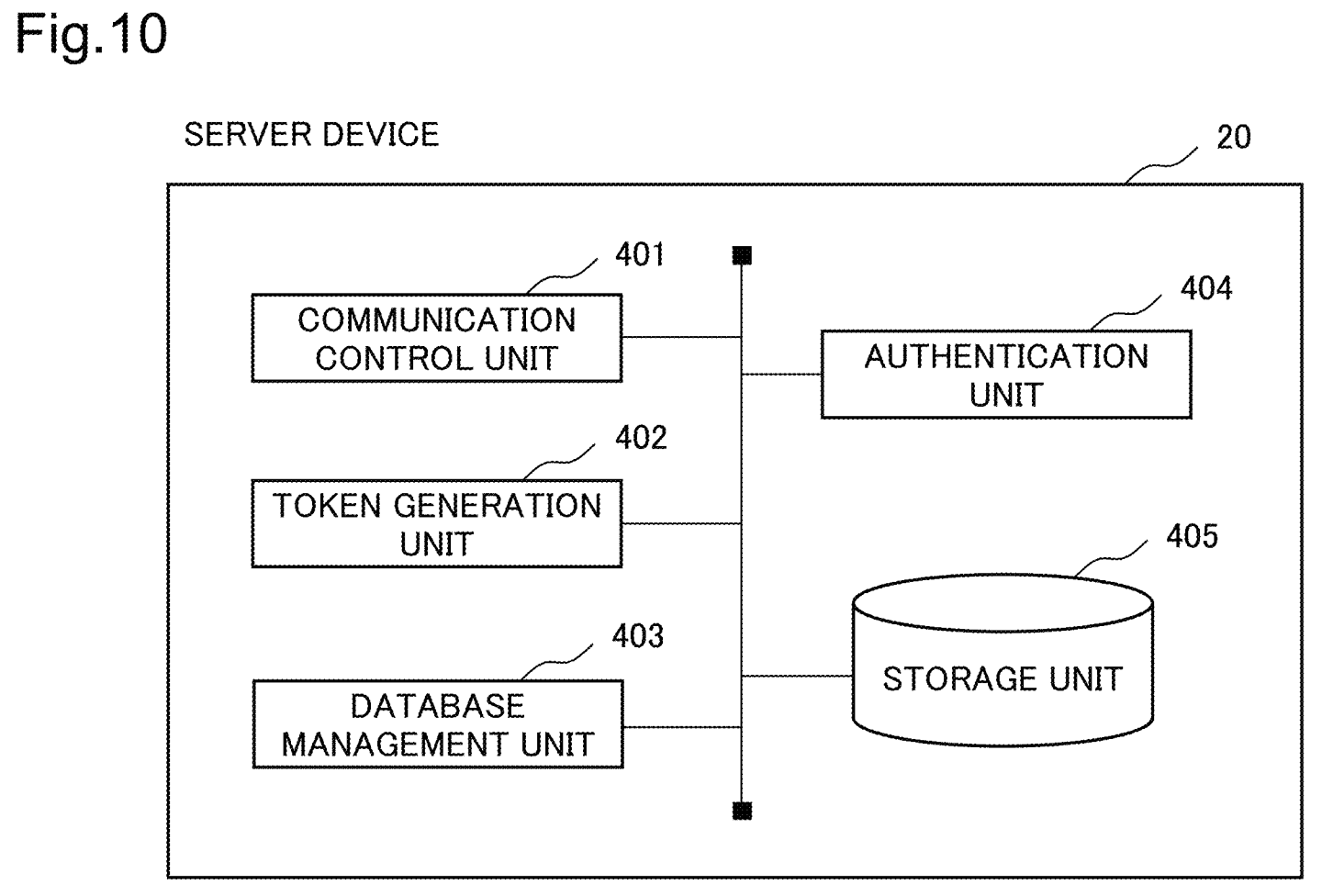

SERVER DEVICE

20

COMMUNICATION CONTROL UNIT 401

TOKEN GENERATION UNIT 402

DATABASE MANAGEMENT UNIT 403

AUTHENTICATION UNIT 404

STORAGE UNIT 405

Fig.11

TOKEN ID INFORMATION DATABASE

| TOKEN ID | REGISTERED FACE IMAGE | FEATURE AMOUNT | ISSUE TIME | DEVICE NAME | ... |
|----------|----------------------|----------------|------------|-------------|-----|
| ID01 | F1 | Fv1 | 12:01:01 | D1 | ... |
| ID02 | F2 | Fv2 | 12:02:02 | D2 | ... |
| ID03 | F3 | Fv3 | 12:03:03 | D3 | ... |
| ... | ... | ... | ... | ... | ... |

Fig.12

BUSINESS INFORMATION DATABASE

| TOKEN ID | PASSENGER NAME | DEPARTURE PLACE | DESTINATION | AIRLINE CODE | FLIGHT NUMBER | OPERATION DATE | |
|---|---|---|---|---|---|---|---|
| ID01 | AAA | A1 | B1 | C1 | AA1 | 2020/1/20 | ... |
| ID02 | BBB | A2 | B2 | C2 | AA2 | 2020/1/20 | ... |
| ID03 | CCC | A3 | B3 | C3 | AA3 | 2020/1/20 | ... |
| ... | ... | ... | ... | ... | ... | ... | ... |

Fig.16

| AUTHENTICATION ID | TOKEN ID | TERMINAL IDENTIFIER | ACQUIRED FACE IMAGE | REGISTERED FACE IMAGE |
|---|---|---|---|---|
| ID_A1 | ID11 | tID11 | oF11 | rF11 |
| ID_A2 | ID12 | tID12 | oF12 | rF12 |
| ID_A3 | ID13 | tID13 | oF13 | rF13 |
| ID_A4 | ID14 | tID14 | oF14 | rF14 |
| ... | ... | ... | ... | ... |

Fig.17

SERVER DEVICE 20

311 PROCESSOR

312 MEMORY

313 INPUT/OUTPUT INTERFACE

314 COMMUNICATION INTERFACE

Fig.18

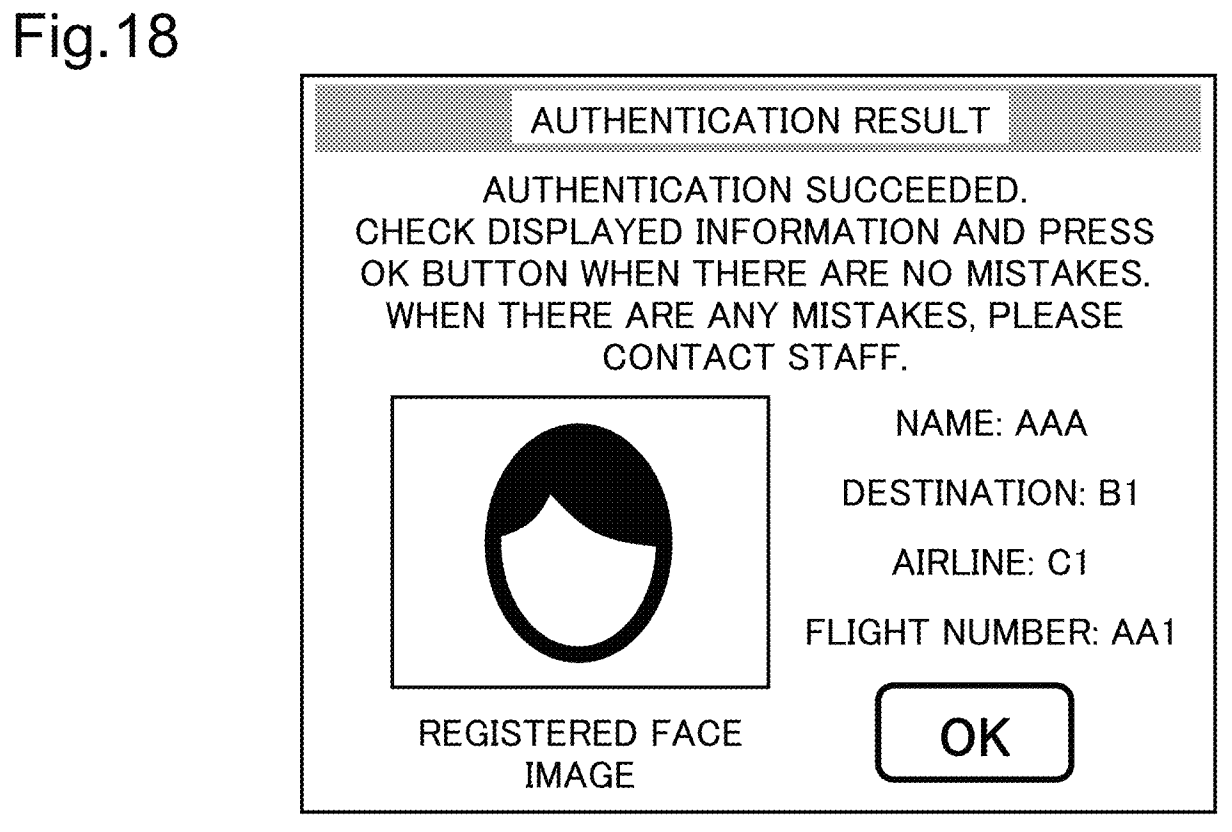

AUTHENTICATION RESULT

AUTHENTICATION SUCCEEDED.
CHECK DISPLAYED INFORMATION AND PRESS
OK BUTTON WHEN THERE ARE NO MISTAKES.
WHEN THERE ARE ANY MISTAKES, PLEASE
CONTACT STAFF.

NAME: AAA

DESTINATION: B1

AIRLINE: C1

FLIGHT NUMBER: AA1

OK

REGISTERED FACE
IMAGE

SERVER DEVICE, SYSTEM, METHOD FOR CONTROLLING SERVER DEVICE, AND STORAGE MEDIUM

This application is a National Stage Entry of PCT/JP2020/034514 filed on Sep. 11, 2020, the contents of all of which are incorporated herein by reference, in their entirety.

TECHNICAL FIELD

The present invention relates to a server device, a system, a method for controlling a server device, and a storage medium.

BACKGROUND ART

Entrance/exit examinations are conducted at airports, ports, and the like. An officer in charge of the entrance/exit examination compares a face photograph affixed to a passport with a face of a person in front of the officer, and permits the person to enter or leave the country when a face image of the passport matches the face of the person in front of the officer.

There has been developed a technique related to the use of biometric authentication for the entrance/exit examination procedure.

For example, PTL 1 describes that since an operator can grasp a factor of a face recognition result at a glance, the face recognition result can be confirmed or corrected on the spot.

A display control device of PTL 1 includes a similarity acquisition unit and a display control unit. The similarity acquisition unit acquires a similarity derived by collation processing for each partial region of a face image. The display control unit performs control to display at least one of a first region whose similarity exceeds a threshold and a second region whose similarity does not exceed the threshold on the face image in a superimposed manner.

PTL 2 describes providing a security inspection confirmation system capable of enhancing security inspection at an airport. The system of PTL 2 includes a storage unit, a collation unit, and a notification unit. The storage unit stores first face image data of a person included in a first captured image acquired by a first imaging unit. The collation unit collates second face image data of a passenger included in a second captured image acquired by a second imaging unit with the first face image data. The notification unit notifies a result of the collation in the collation unit.

CITATION LIST

Patent Literature

[PTL 1] WO 2017/043132 A1
[PTL 2] JP 2019-125237 A

SUMMARY OF INVENTION

Technical Problem

As disclosed in PTLs 1 and 2, various technologies related to biometric authentication have been developed. However, probability of the biometric authentication is limited, and a certain ratio of false authentication (different person acceptance, rejection by the person in question) may occur. When the false authentication occurs in a procedure at an airport, it takes time to correct the false authentication, or a user leaves for a foreign country while boarding a wrong passenger aircraft.

A main object of the present invention is to provide a server device, a system, a method of controlling a server device, and a storage medium that contribute to enabling detection of occurrence of false authentication (in particular, different person acceptance) in biometric authentication.

Solution to Problem

According to a first aspect of the present invention, there is provided a server device including: an acquisition unit configured to acquire biometric information of a person to be authenticated from a terminal; and an authentication unit configured to perform biometric authentication using the biometric information of the person to be authenticated and biometric information of each of a plurality of users registered in advance, in which the authentication unit transmits authentication result information including the biometric information acquired from the terminal and registered biometric information of a successful authentication person who has succeeded in the biometric authentication to a staff terminal used by a staff when a predetermined condition is satisfied.

According to a second aspect of the present invention, there is provided a system including: a terminal; a staff terminal used by a staff; and a server device connected to the terminal and the staff terminal, in which the server device includes: an acquisition unit configured to acquire biometric information of a person to be authenticated from the terminal; and an authentication unit configured to perform biometric authentication using the biometric information of the person to be authenticated and biometric information of each of a plurality of users registered in advance, and the authentication unit transmits authentication result information including the biometric information acquired from the terminal and registered biometric information of a successful authentication person who has succeeded in the biometric authentication to the staff terminal when a predetermined condition is satisfied.

According to a third aspect of the present invention, there is provided a method for controlling a server device, including: in the server device, acquiring biometric information of a person to be authenticated from a terminal; performing biometric authentication using the biometric information of the person to be authenticated and biometric information of each of a plurality of users registered in advance; and transmitting authentication result information including the biometric information acquired from the terminal and registered biometric information of a successful authentication person who has succeeded in the biometric authentication to a staff terminal used by a staff when a predetermined condition is satisfied.

According to a fourth aspect of the present invention, there is provided a computer-readable storage medium storing a program for causing a computer mounted on a server device to execute: a process of acquiring biometric information of a person to be authenticated from a terminal; a process of performing biometric authentication using the biometric information of the person to be authenticated and biometric information of each of a plurality of users registered in advance; and a process of transmitting authentication result information including the biometric information acquired from the terminal and registered biometric information of a successful authentication person who has succeeded in the biometric authentication to a staff terminal used by a staff when a predetermined condition is satisfied.

Advantageous Effects of Invention

According to each aspect of the present invention, there are provided a server device, a system, a method for controlling a server device, and a storage medium that contribute to enabling detection of occurrence of false authentication (in particular, different person acceptance) in biometric authentication. Effects of the present invention are not limited to the above. According to the present invention, other effects may be exhibited instead of or in addition to the effects.

BRIEF DESCRIPTION OF DRAWINGS

FIG. 2 is a diagram illustrating an example of a schematic configuration of a boarding procedure system according to a first example embodiment.

FIG. 9 is a diagram illustrating an example of an authentication request according to the first example embodiment.

FIG. 10 is a diagram illustrating an example of a processing configuration of a server device according to the first example embodiment.

FIG. 11 is a diagram illustrating an example of a token ID information database according to the first example embodiment.

FIG. 12 is a diagram illustrating an example of a business information database according to the first example embodiment.

FIG. 16 is a diagram illustrating an example of information stored in a server device according to a second example embodiment.

FIG. 17 is a diagram illustrating an example of a hardware configuration of the server device.

FIG. 18 is a diagram for explaining an operation of a terminal according to a modification of the present disclosure.

EXAMPLE EMBODIMENT

Figure 1:
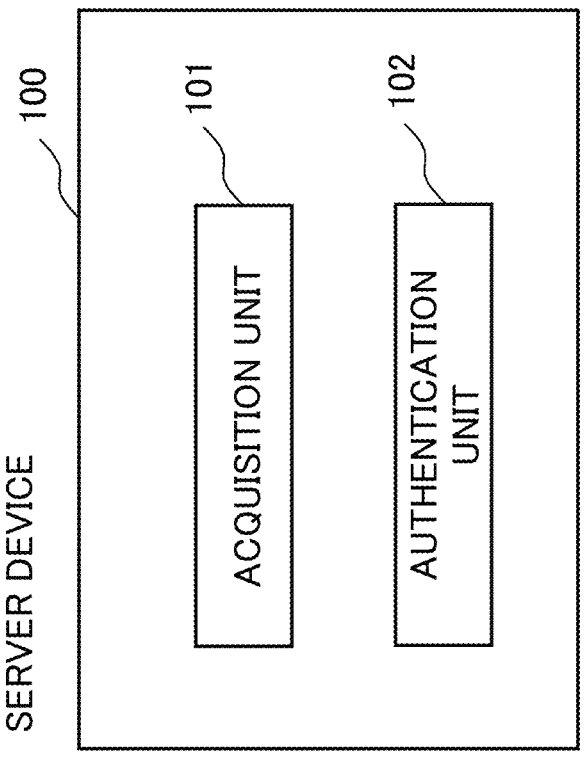
FIG. 1 is a diagram for describing an outline of an example embodiment.

First, an outline of an example embodiment will be described. Reference numerals in drawings attached to this outline are attached to each element for convenience as an example for assisting understanding, and descriptions of this outline are not intended to be any limitation. In a case where there is no particular explanation, a block described in each drawing represents not a configuration of a hardware unit but a configuration of a functional unit. Connection lines between blocks in each drawing include both bidirectional and unidirectional lines. A unidirectional arrow schematically indicates a flow of a main signal (data), and does not exclude bidirectionality. In the present specification and the drawings, elements that can be similarly described are denoted by the same reference numerals, and redundant descriptions thereof can be omitted.

A server device 100 according to an example embodiment includes an acquisition unit 101 and an authentication unit 102 (see FIG. 1). The acquisition unit 101 acquires biometric information of a person to be authenticated from a terminal. The authentication unit 102 performs biometric authentication using the biometric information of the person to be authenticated and biometric information of each of a plurality of users registered in advance. In a case where a predetermined condition is satisfied, the authentication unit 102 transmits authentication result information including the biometric information acquired from the terminal and registered biometric information regarding a successful authentication person who has succeeded in biometric authentication to a staff terminal used by a staff.

When the authentication of the person to be authenticated succeeds, the server device 20 transmits the biometric information (for example, a face image acquired by the terminal, a registered face image registered in advance) used for the authentication to the terminal used by the staff in a case where a predetermined condition is satisfied. The staff terminal presents these pieces of information to the staff of the airport or the like. The staff compares the two presented face images and detects occurrence of false authentication (different person acceptance). At this time, the staff terminal displays the authentication result (two face images) narrowed down in advance by the server device 20. As a result, since the staff only needs to carefully check the narrowed authentication result, a probability of overlooking the occurrence of the different person acceptance decreases. That is, a system including the server device 100 can detect the occurrence of the false authentication (in particular, different person acceptance) in the biometric authentication.

Hereinafter, specific example embodiments will be described in more detail with reference to the drawings.

First Example Embodiment

A first example embodiment will be described in more detail with reference to the drawings.

[Configuration of System]

FIG. 2 is a diagram illustrating an example of a schematic configuration of a boarding procedure system according to the first example embodiment. The boarding procedure system according to the first example embodiment is a system that achieves a series of procedures (deposit of baggage, security check, or the like) at an airport by biometric authentication. The boarding procedure system illustrated in FIG. 2 is operated by, for example, a public institution such as a control station for immigration or emigration, or a depositor who has accepted a commission from the public institution.

In the present disclosure, the "boarding procedure" indicates a series of procedures performed from check in to boarding of the aircraft.

Referring to FIG. 2, the boarding procedure system includes a check-in terminal 10, a baggage checking machine 11, a passenger passage system 12, a gate device 13, a boarding gate device 14, and a server device 20.

The check-in terminal 10, the baggage checking machine 11, the passenger passage system 12, the gate device 13, and the boarding gate device 14 are terminals (touch points) installed at the airport. These terminals are connected to the server device 20 via a network. The network illustrated in FIG. 2 includes a local area network (LAN) including an airport local communication network, a wide area network (WAN), a mobile communication network, and the like. The connection method is not limited to a wired method, and may be a wireless method.

The server device 20 is installed in a facility such as an airport company. Alternatively, the server device 20 may be a server installed in a cloud on a network.

The configuration illustrated in FIG. 2 is an example and is not intended to limit the configuration of the boarding procedure system. The boarding procedure system may include a device (not illustrated) or the like.

A boarding procedure of a user is performed by each terminal illustrated in FIG. 2. Specifically, a series of procedures when the user leaves a country is sequentially performed by terminals installed at five places. In the boarding procedure system illustrated in FIG. 2, the boarding procedure of the user is achieved by authentication (biometric authentication) using biometric information.

The biometric information in the present disclosure is a face image, a fingerprint image, an iris image, a finger vein image, a palm print image, a palm vein image, or the like. Alternatively, the biometric information may be voice data (voiceprint) in which human voice is stored. The biometric information may be one or a plurality of pieces of biometric information. The term "biometric information" in the disclosure of the present application means image data including all or a part of a living body, audio data, and a feature amount extracted from the image.

When arriving at the airport, a user (system user) who desires the boarding procedure by the biometric authentication operates the check-in terminal 10 to perform a "check-in procedure". The system user presents a paper airline ticket, a two-dimensional barcode describing boarding information, a mobile terminal displaying a copy of an e-ticket, and the like to the check-in terminal 10. Upon completion of the check-in procedure, the check-in terminal 10 outputs a boarding pass. The boarding pass includes a boarding pass of a paper medium and a boarding pass of an electronic medium.

The system user who has completed the check-in procedure and desires a boarding procedure by the biometric authentication performs system registration using the check-in terminal 10. Specifically, the system user causes the check-in terminal 10 to read the acquired boarding pass and passport. The check-in terminal 10 acquires the biometric information (for example, face image) of the system user.

The check-in terminal 10 transmits information regarding these (boarding pass, passport, biometric information) to the server device 20.

The server device 20 confirms validity of the information acquired from the check-in terminal 10. Specifically, server device 20 confirms the validity of the presented passport. Upon completion of the confirmation, the server device 20 registers the system user. Specifically, the server device 20 issues a token used for the boarding procedure of the user registered in the system.

The issued token is identified by a token identifier (ID). Information (for example, biometric information, business information necessary for boarding procedure, and the like) necessary for the boarding procedure is associated with the token ID. That is, the "token" is issued together with the registration of the system user, and is identification information for the registered system user to receive the boarding procedure using the biometric information. When the token (token ID) is issued, the system user can use the boarding procedure using the biometric authentication.

In response to the generation of the token, the server device 20 adds an entry to each of the token ID information database and the business information database.

The token ID information database is a database that stores detailed information of the generated token. The database stores at least the token ID and the biometric information (face image, feature amount) in association with each other. The server device 20 performs the biometric authentication with reference to the token ID information database.

The business information database is a database that stores the business information. The business information database stores the token ID and the business information in association with each other.

When the system user to which the token is issued arrives at the terminal, the biometric information (for example, face image) is acquired in the terminal. The terminal transmits an authentication request including the face image to the server device 20.

In the present disclosure, when described as the "terminal", it means an apparatus, a device, or the like that transmits an authentication request including the biometric information to the server device 20. In the example of FIG. 2, the baggage checking machine 11, the passenger passage system 12, the gate device 13, and the boarding gate device 14 correspond to the "terminals". Alternatively, in a case where the check-in procedure is also performed by the biometric authentication, the check-in terminal 10 also corresponds to the "terminal".

The server device 20 performs the biometric authentication using the biometric information acquired from the terminal and the biometric information registered in the system. When the biometric authentication succeeds, the server device 20 transmits an affirmative response including the biometric information (registered face image) on the registration side used for the biometric authentication and the business information to the terminal. When the biometric authentication fails, the server device 20 transmits a negative response indicating the failure to the terminal.

The terminal that has received the authentication success performs the boarding procedure of the user based on the acquired business information. The terminal opens a gate or the like as necessary to allow the user to pass.

The terminal that has received the authentication result (authentication success, authentication failure) performs display according to the result. Specifically, the terminal provides information to a passenger (person to be authenticated) using a liquid crystal display or the like. A display device such as a liquid crystal display is installed at a location where the person to be authenticated can easily visually recognize. The liquid crystal display or the like may be installed on the terminal or may be installed away from the terminal. Alternatively, an image or the like may be projected on the floor through which the passenger passes, and information may be provided to the person to be authenticated.

Figure 3:
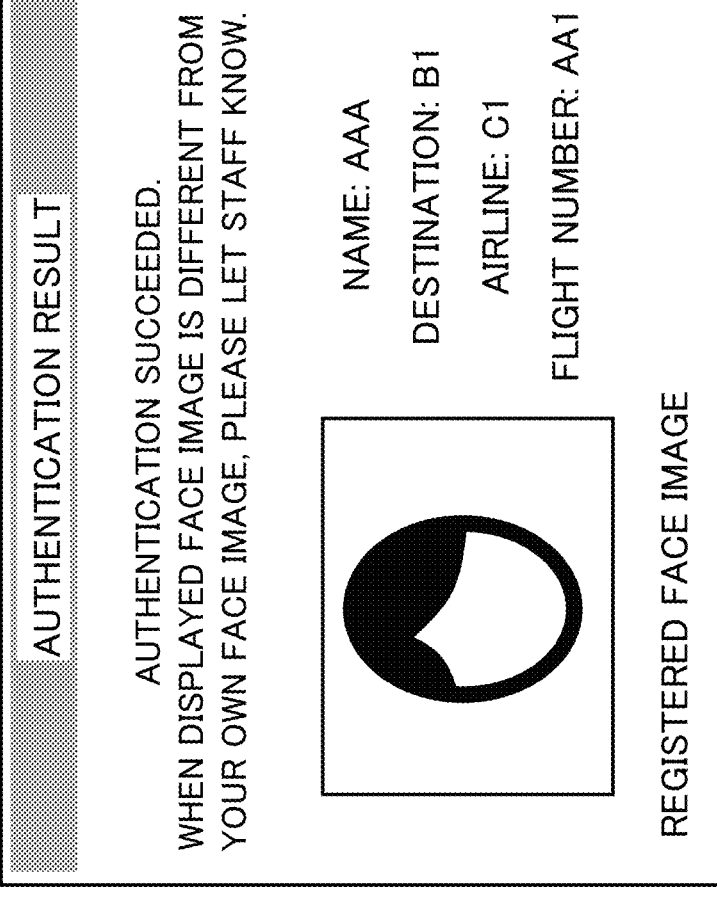
FIG. 3 is a diagram for explaining an operation of a terminal according to the first example embodiment.
Figure 4:
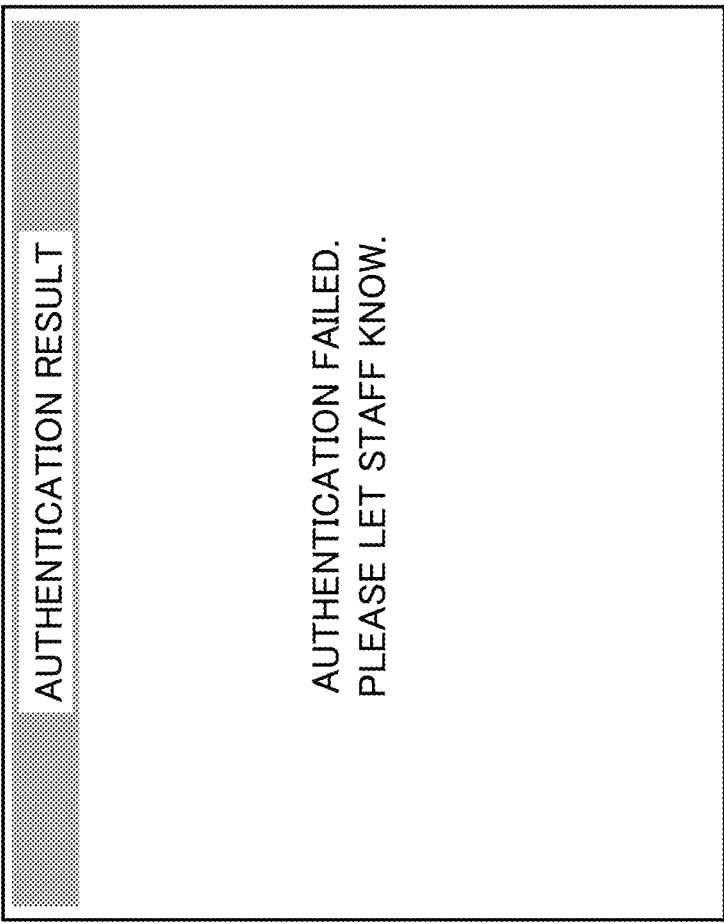
FIG. 4 is a diagram for explaining the operation of the terminal according to the first example embodiment.

The terminal that has received the authentication success performs display including the biometric information (face image on the registration side) acquired from the server device 20. For example, the terminal performs display as illustrated in FIG. 3. The terminal that has received the authentication failure performs display as illustrated in FIG. 4, for example. The person to be authenticated checks the display of the terminal.

The display illustrated in FIG. 3 is an example and is not intended to limit the content. Displayed contents and the like may be different depending on the type of terminal. For example, items such as a name, a destination, an airline, and a flight number may be commonly displayed on each terminal, and a departure time of the boarding flight may be displayed only on the boarding gate device 14.

Here, there are four combinations of the authentication result (authentication success, authentication failure) by the server device 20 and correctness (authentication result is correct, error) of the authentication result as follows.

A first combination is a case where the authentication success and the authentication result are correct. Specifically, a case where a user A is the person to be authenticated and the server device 20 also recognizes the person to be authenticated as the user A corresponds to the first combination.

The second combination is a case where the authentication success and the authentication result are erroneous (occurrence of different person acceptance). For example, a case where the user A is the person to be authenticated and the server device 20 recognizes a user B as the person to be authenticated corresponds to the second combination.

The third combination is a case where the authentication failure and the authentication result are correct. Specifically, the third combination may occur in a case where the biometric information of the person to be authenticated is not registered in the server device 20.

The fourth combination is a case where the authentication failure and the authentication result are erroneous (occurrence of the person himself/herself rejection). For example, a case where the server device 20 fails to authenticate the user A even though the biometric information of the user A is registered in the server device 20 corresponds to the fourth combination.

In the case of the first combination, the person to be authenticated passes through a gate or the like without having any doubt even when coming into contact with the display as illustrated in FIG. 3. Since the face image of the person himself/herself is displayed on the terminal, the person to be authenticated considers that the procedure by the biometric authentication has been normally completed.

In the case of the second combination, when coming into contact with the display as illustrated in FIG. 3, the person to be authenticated has a question about whether the person to be authenticated may pass through a gate or the like. This is because a gate or the like is opened and can be passed, but a face image of another person is displayed. Even when information different from the information (destination, airline, or the like) regarding the flight considered by the person to be authenticated is displayed, the person to be authenticated has a question about whether the person to be authenticated may pass through the gate. In such a case, the person to be authenticated (successful authentication person) notifies a staff or the like waiting near the terminal of the above fact (that the face image of another person is displayed). The staff or the like checks the passport or the like possessed by the user, supports the procedure of the user, and corrects the authentication result of the server device 20 as necessary.

In the case of the third combination and the fourth combination, the person to be authenticated inquires of the staff waiting in the vicinity of the terminal about the measure when coming in contact with the display as illustrated in FIG. 4.

The staff listens to a situation (for example, whether a token issue procedure for receiving biometric authentication has been performed) of the person to be authenticated (authentication failure person). When the person to be authenticated has not performed the above procedure, the staff requests the person to be authenticated to perform the token issue procedure. Alternatively, in a case where the person to be authenticated has performed the token issue procedure, the staff may confirm the passport or the boarding pass possessed by the person to be authenticated and proceed the procedure.

Next, a schematic configuration, a function, and the like of each device will be described.

The check-in terminal 10 is installed in a check-in lobby in the airport. As described above, the user performs system registration for achieving the boarding procedure using the biometric authentication using the check-in terminal 10. The system user performs the check-in procedure by operating the check-in terminal 10. That is, the check-in terminal 10 is also a self-terminal for performing a check-in procedure by being operated by the user. The check-in terminal 10 is also referred to as a common use self service (CUSS) terminal. After completing the check-in procedure, the user moves to a baggage checking location or a security check area.

The baggage checking machine 11 is installed in an area adjacent to a baggage counter (manned counter) or an area near the check-in terminal 10 in the airport. The baggage checking machine 11 is a self-terminal for performing a procedure (baggage checking procedure) of checking baggage that is not brought into the aircraft by being operated by a user. The baggage checking machine 11 is also referred to as a common use bag drop (CUBD) terminal. After completing the baggage checking procedure, the user moves to the security check area. In a case where the user does not check baggage, baggage checking procedures are omitted.

The passenger passage system 12 is a gate device installed at an entrance of the security check area in an airport. The passenger passage system 12 is also referred to as a passenger reconciliation system (PRS), and is a system that determines whether a user can pass at the entrance of the security check area. When the user completes a security inspection procedure after passing through the passenger passage system 12, the user moves to a departure examination site.

The gate device 13 is installed in the departure examination site in the airport. Gate device 13 is a device that automatically performs a departure examination procedure of the user. After completing the departure examination procedure, the user moves to a departure area where a duty-free shop and a boarding gate are provided.

The boarding gate device 14 is a passage control device installed for each boarding gate in the departure area. The boarding gate device 14 is a final stage gate device in a series of procedures of a departure examination (examination using biometric information). The boarding gate device 14 is also referred to as an automated boarding gates (ABG) terminal. The boarding gate device 14 confirms that the user is a passenger of an aircraft that can be boarded from the boarding gate. After passing through the boarding gate device 14, the user boards the aircraft and leaves for a second country.

The boarding procedure using biometric authentication by each device (check-in terminal 10, baggage checking machine 11, passenger passage system 12, gate device 13, boarding gate device 14) illustrated in FIG. 2 is an example, and is not intended to limit the device used for the procedure. For example, a device different from the above device may be used for the boarding procedure, or some of the above devices may not be used for the procedure. For example, the gate device 13 may not be included in the boarding procedure system.

The server device 20 is a server device for supporting and managing the boarding procedure. The server device 20 manages the token ID. Specifically, the server device 20 issues or invalidates the token ID. The server device 20 processes authentication requests from various terminals in the airport.

Next, details of each device included in the boarding procedure system according to the first example embodiment will be described. In the following description, a "face image" or a "feature amount generated from the face image" of the user will be described as an example of the biometric information.

[Check-In Terminal]

As described above, the check-in terminal 10 is a device that provides the system user with an operation related to the check-in procedure and the system registration.

Figure 5:
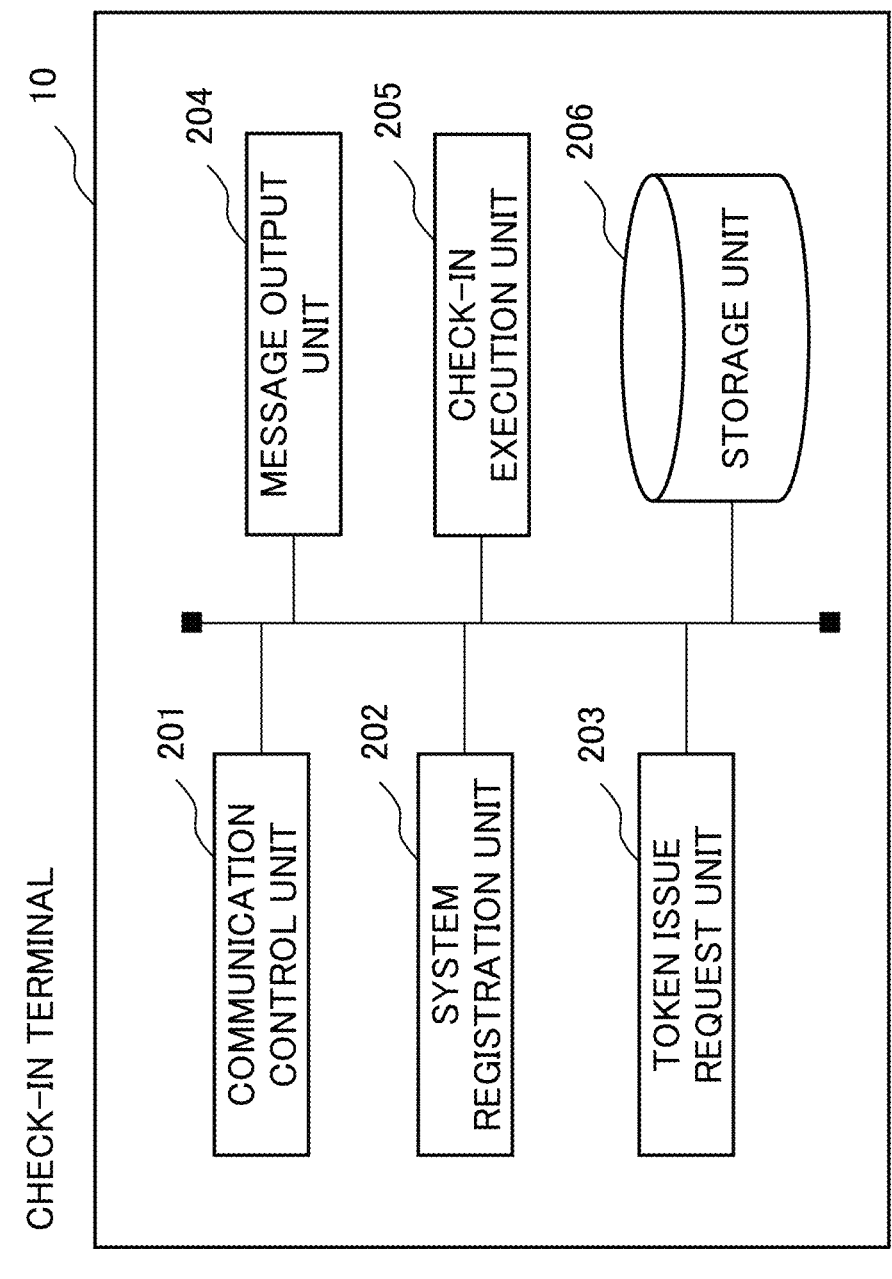
FIG. 5 is a diagram illustrating an example of a processing configuration of a check-in terminal according to the first example embodiment.

FIG. 5 is a diagram illustrating an example of a processing configuration (processing module) of the check-in terminal 10 according to the first example embodiment. Referring to FIG. 5, the check-in terminal includes a communication control unit 201, a system registration unit 202, a token issue request unit 203, a message output unit 204, a check-in execution unit 205, and a storage unit 206.

The communication control unit 201 is a unit that controls communication with other devices. For example, the communication control unit 201 receives data (packet) from the server device 20. The communication control unit 201 transmits data to the server device 20. The communication control unit 201 delivers data received from another device to another processing module. The communication control unit 201 transmits data acquired from another processing module to another device. In this manner, the other processing modules transmit and receive data to and from other devices via the communication control unit 201.

Figure 6:
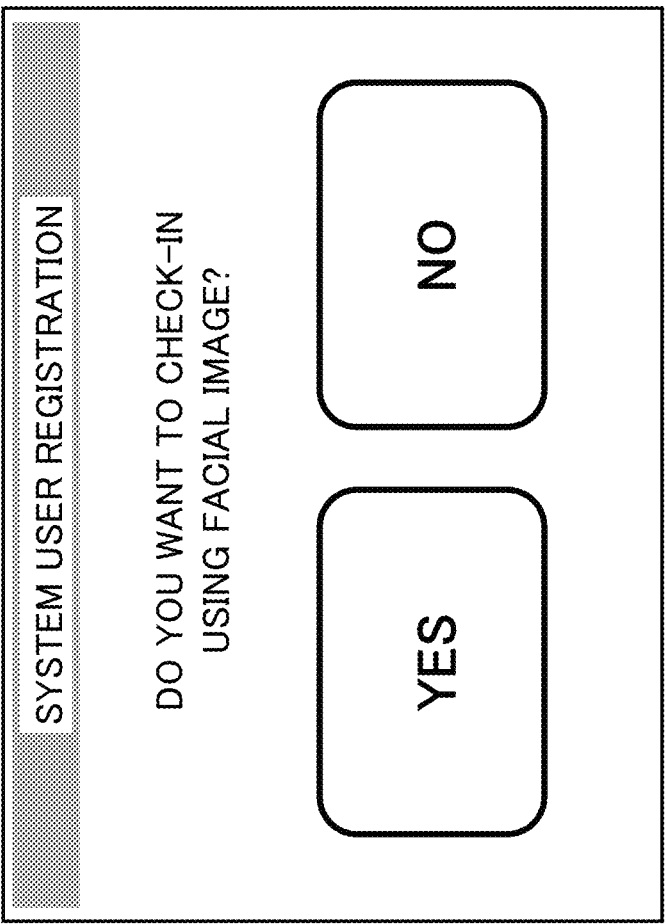
FIG. 6 is a diagram for explaining an operation of a system registration unit according to the first example embodiment.

The system registration unit 202 is a unit that performs system registration of a user who desires the boarding procedure by the biometric authentication. For example, after the completion of the check-in procedure, the system registration unit 202 provides the user with a graphical user interface (GUI) for confirming whether the user desires the "boarding procedure using the face image" (see FIG. 6).

When the user wishes to perform the boarding procedure using the face image, the system registration unit 202 acquires three pieces of information (information described in boarding pass, information described in passport, and biometric information) using the GUI.

Figure 7:
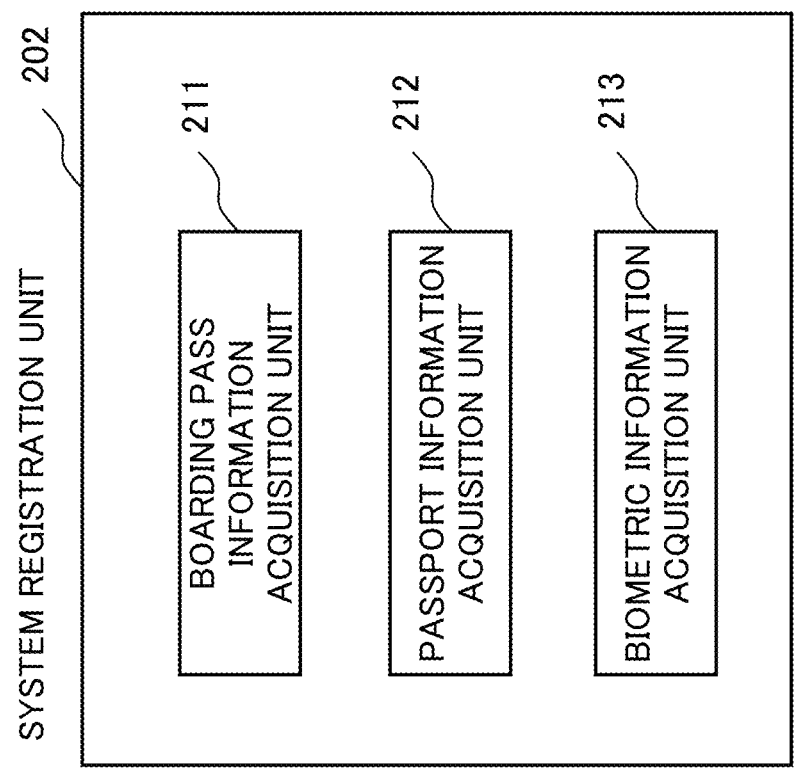
FIG. 7 is a diagram illustrating an example of the processing configuration of the system registration unit according to the first example embodiment.

The system registration unit 202 includes three submodules. FIG. 7 is a diagram illustrating an example of a processing configuration (processing module) of the system registration unit 202 according to the first example embodiment. As shown in FIG. 7, the system registration unit 202 includes a boarding pass information acquisition unit 211, a passport information acquisition unit 212, and a biometric information acquisition unit 213.

The boarding pass information acquisition unit 211 is a unit that acquires information (hereinafter, referred to as boarding pass information) described in the boarding pass possessed by the system user. The boarding pass information acquisition unit 211 controls a reader (not illustrated) such as a scanner to acquire the boarding pass information.

The boarding pass information includes a name (last name, first name), an airline code, a flight number, a boarding date, a departure place (boarding airport), a destination (destination airport), a seat number, a boarding time, an arrival time, and the like.

The passport information acquisition unit 212 is a means for acquiring information (hereinafter, described as passport information) described in the passport possessed by the system user. The passport information acquisition unit 212 controls a reader such as a scanner to acquire the passport information.

The passport information includes a face image (hereinafter, referred to as a passport face image), a name, a gender, a nationality, a passport number, a passport issuing country, and the like.

The biometric information acquisition unit 213 is a unit that acquires the biometric information of the system user. The biometric information acquisition unit 213 controls the camera to acquire the face image of the system user. For example, when detecting the face in an image that is constantly or periodically captured, the biometric information acquisition unit 213 captures the face of the user and acquires the face image.

It is desirable that the biometric information acquisition unit 213 display a guidance message regarding capturing of the face image via the message output unit 204 before capturing the face image. For example, the biometric information acquisition unit 213 notifies the user of a message such as "we will capture a face image of you and register the image face in the system. The registered face image will be deleted from the system after the boarding is completed".

The system registration unit 202 delivers the acquired three pieces of information (boarding pass information, passport information, and biometric information) to the token issue request unit 203.

The token issue request unit 203 illustrated in FIG. 5 is a unit that requests the server device 20 to issue a token. The token issue request unit 203 generates a token issue request including the boarding pass information, the passport information, and the biometric information (face image). The token issue request unit 203 transmits the generated token issue request to the server device 20.

The token issue request unit 203 delivers the response (response to the token issue request) acquired from the server device 20 to the message output unit 204.

The message output unit 204 is a unit that outputs various messages. For example, the message output unit 204 outputs a message corresponding to the response acquired from the server device 20.

In a case where a response (affirmative response) indicating that the token has been successfully issued is received, the message output unit 204 outputs the fact. For example, the message output unit 204 outputs a message such as "the future procedure can be performed by face authentication".

In a case where a response (negative response) indicating that the issue of the token has failed is received, the message output unit 204 outputs the fact. For example, the message output unit 204 outputs a voice message like "sorry. the face authentication procedure cannot be performed. please head to a manned booth".

The check-in execution unit 205 is a unit that performs the check-in procedure of the user. The check-in execution unit 205 executes a check-in procedure such as selection of a seat based on an airline ticket presented by the user. For example, the check-in execution unit 205 transmits the information described in the airline ticket to a Departure Control System (DCS), and acquires the information described in the boarding pass from the DCS. The operation of the check-in execution unit 205 can be the same as the operation of the existing check-in terminal, and thus a more detailed description will be omitted.

The storage unit 206 is a unit that stores information necessary for the operation of the check-in terminal 10.

[Boarding Gate Device]

Figure 8:
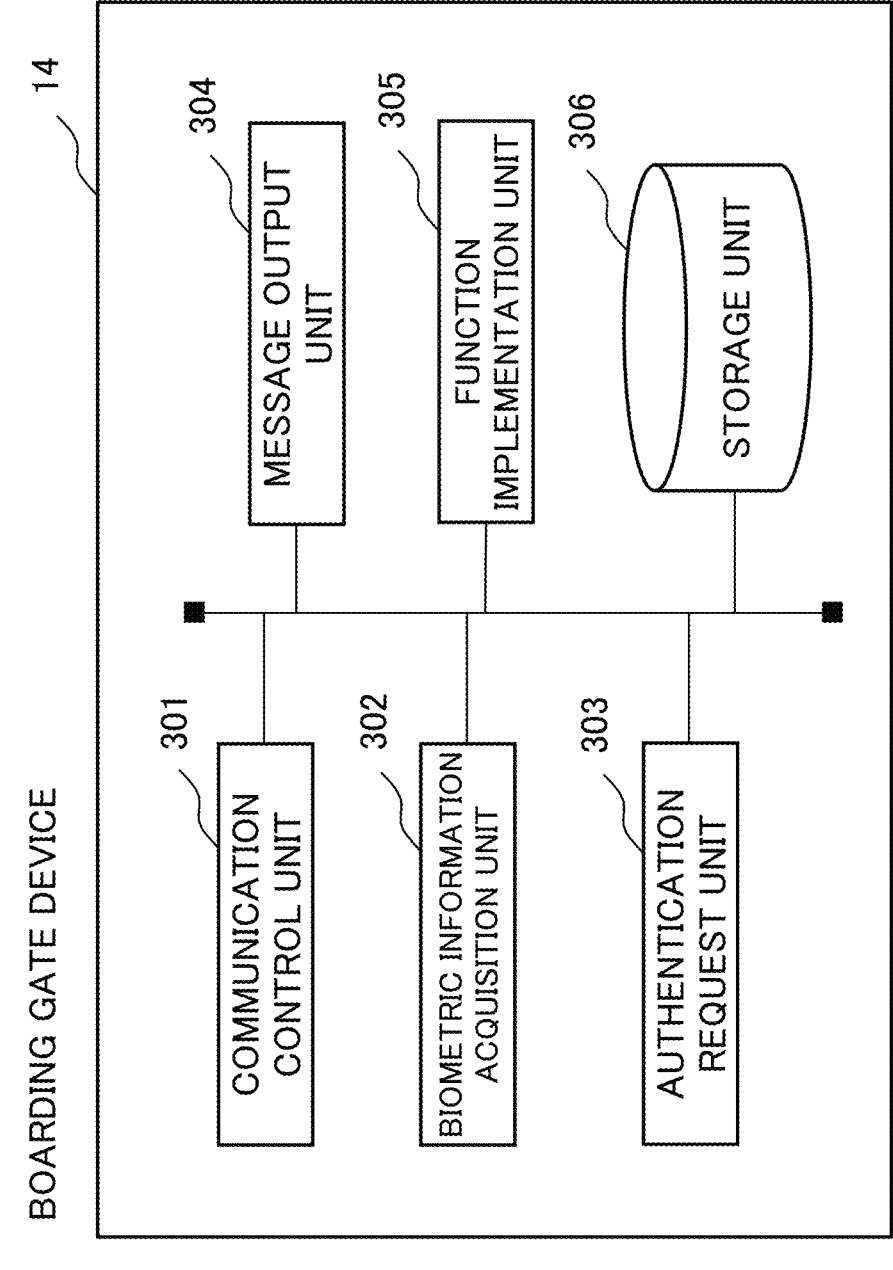
FIG. 8 is a diagram illustrating an example of a processing configuration of a boarding gate device according to the first example embodiment.

FIG. 8 is a diagram illustrating an example of a processing configuration (processing module) of the boarding gate device 14 according to the first example embodiment. Referring to FIG. 8, the boarding gate device 14 includes a communication control unit 301, a biometric information acquisition unit 302, an authentication request unit 303, a message output unit 304, a function implementation unit 305, and a storage unit 306.

The communication control unit 301 is a unit that controls communication with other devices. For example, the communication control unit 301 receives data (packet) from the server device 20. The communication control unit 301 transmits data to the server device 20. The communication control unit 301 delivers data received from another device to another processing module. The communication control unit 301 transmits data acquired from another processing module to another device. In this manner, the other processing modules transmit and receive data to and from other devices via the communication control unit 301.

The biometric information acquisition unit 302 is a unit that controls a camera (not illustrated) to acquire the biometric information of the user. The biometric information acquisition unit 302 images the front of the own device periodically or at a predetermined timing. The biometric information acquisition unit 302 determines whether a face image of a person is included in the acquired image, and extracts the face image from the acquired image data when the face image is included.

Since an existing technique can be used for the face image detection processing and the face image extraction processing by the biometric information acquisition unit 302, detailed description thereof will be omitted. For example, the biometric information acquisition unit 302 may extract the face image (face area) from the image data by using a learning model learned by a convolutional neural network (CNN). Alternatively, the biometric information acquisition unit 302 may extract the face image using a method such as template matching.

The biometric information acquisition unit 302 delivers the extracted face image to the authentication request unit 303.

Figure 9:
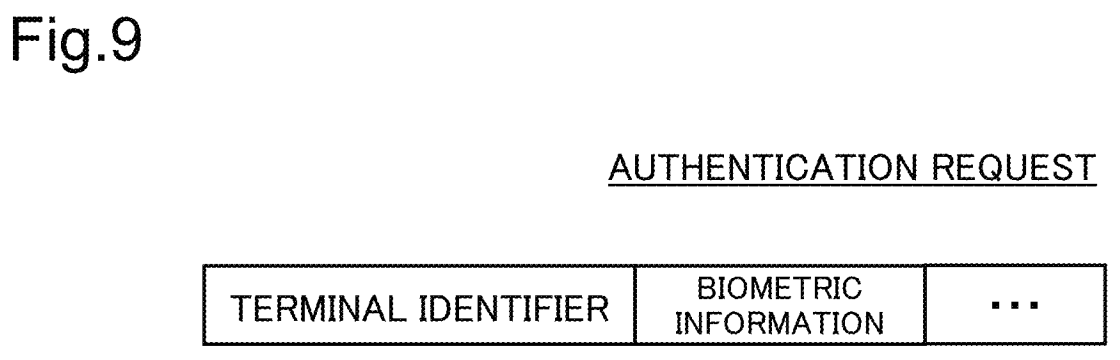

The authentication request unit 303 is a unit that requests the server device 20 to authenticate the user in front. The authentication request unit 303 generates an authentication request including an identifier (hereinafter, referred to as a terminal identifier) of the own device, the acquired face image, and the like (see FIG. 9). A media access control (MAC) address, an Internet protocol (IP) address, or the like can be used as the terminal identifier. The authentication request unit 303 transmits the generated authentication request to the server device 20.

The server device 20 can uniquely specify the terminal that is a transmission source of the authentication request by confirming the terminal identifier included in the authentication request. The server device 20 can also specify the type of terminal (baggage checking machine 11, passenger passage system 12, gate device 13, boarding gate device 14) based on the terminal identifier. The terminal identifier is shared between each terminal included in the system and the server device 20. For example, a system administrator or the like may determine a terminal identifier and input the determined terminal identifier to each terminal. The system administrator may input table information or the like in which the terminal identifier and the type of the terminal are associated with each other to the server device 20.

The authentication request unit 303 receives a response to the authentication request from the server device 20. The authentication request unit 303 delivers the response acquired from the server device 20 to the message output unit 304 and the function implementation unit 305.

The message output unit 304 is a unit that outputs various messages. For example, the message output unit 304 performs display as illustrated in FIGS. 3 and 4 according to the authentication result (authentication success, authentication failure) acquired from the server device 20.

When the authentication success is acquired, the message output unit 304 performs display including the face image (registered face image) acquired from the server device 20. Alternatively, as illustrated in FIG. 3, the message output unit 304 may display the personal information (name and the like) of the successful authentication person (the person to be authenticated determined as authentication success) and the information (information regarding airline, information regarding destination airport, passenger flight number, departure time, or the like) regarding the flight of the successful authentication person.

Examples of the information regarding the airline include the name of the airline, the airline code, and the like. The information regarding the destination airport includes the name of the destination airport, the country to which the destination airport belongs, and the like. The message output unit 304 may extract and generate the personal information and the flight information of the successful authentication person from the business information acquired from the server device 20.

When the authentication failure is acquired, the message output unit 304 performs display as illustrated in FIG. 4. That is, the message output unit 304 notifies the authentication failure person (the person to be authenticated determined as the authentication failure) of the fact of the authentication failure.

The function implementation unit 305 is a unit that achieves the function of the boarding gate device 14. The function implementation unit 305 achieves a procedure related to a successful authentication person. The function implementation unit 305 specifies the flight number of the aircraft that can be boarded by the user (successful authentication person) from the acquired business information. The function implementation unit 305 permits the successful authentication person to pass through the gate when the specified flight number matches the flight number assigned to the own device. The operation of the function implementation unit 305 can be the same as the operation of the existing boarding gate device, and thus a detailed description thereof will be omitted. The staff working in the airline of the aircraft boarding from the boarding gate device 14 may assign (input) the necessary flight number to the boarding gate device 14.

In a case where the successful authentication person is permitted to pass through the gate, the function implementation unit 305 notifies the server device 20 of the permission.

The storage unit 306 is a unit that stores information necessary for the operation of the boarding gate device 14.

[Another Terminal]

A basic processing configuration of another terminal (baggage checking machine 11, passenger passage system 12, and gate device 13) included in the boarding procedure system can be the same as the processing configuration of the boarding gate device 14 illustrated in FIG. 8, and thus a detailed description thereof will be omitted. Each terminal acquires the biometric information (face image) of the system user and requests the server device 20 to perform authentication using the acquired biometric information. When the authentication succeeds, the function allocated to each terminal is executed. Each terminal outputs a display (message) corresponding to the authentication result (authentication success, authentication failure).

[Server Device]

FIG. 10 is a diagram illustrating an example of a processing configuration (processing module) of the server device 20 according to the first example embodiment. Referring to FIG. 10, the server device 20 includes a communication control unit 401, a token generation unit 402, a database management unit 403, an authentication unit 404, and a storage unit 405.

The communication control unit 401 is a unit that controls communication with other devices. For example, the communication control unit 401 receives data (packet) from the check-in terminal 10. The communication control unit 401 transmits data to the check-in terminal 10. The communication control unit 401 delivers data received from another device to another processing module. The communication control unit 401 transmits data acquired from another processing module to another device. In this manner, the other processing modules transmit and receive data to and from other devices via the communication control unit 401. The communication control unit 401 has a function as an "acquisition unit" that acquires the biometric information of the person to be authenticated from the terminal. Alternatively, the communication control unit 401 has functions as a "receiving unit" that receives an authentication request including the biometric information of the person to be authenticated and a "transmitting unit" that transmits a response to the authentication request.

The token generation unit 402 is a unit that generates a token in response to a token generation request from the check-in terminal 10. At that time, token generation unit 402 makes a determination related to validity of the passport presented by the user.

Specifically, the token generation unit 402 determines whether a person who presents a passport to the check-in terminal 10 and a person who has received an issuance of the passport are the same person. In order to execute the determination, the token generation unit 402 extracts the face image (the face image of the system user) included in the token generation request and the passport face image included in the passport information. The token generation unit 402 determines whether the two face images substantially match.

The token generation unit 402 executes collation (one-to-one collation) of the two face images. The token generation unit 402 calculates a feature vector from each of the two images. The token generation unit 402 calculates similarity (for example, Euclidean distance) between the two images, and determines whether the two images are face images of the same person based on a result of threshold processing on the calculated similarity. For example, in a case where the similarity is larger than a predetermined value (in a case where the distance is shorter than the predetermined value), the token generation unit 402 determines that the two face images are of the same person.

When the validity determination of the passport using the biometric information is successful, token generation unit 402 issues the token. For example, the token generation unit 402 generates a unique value as the token ID based on date and time, a sequence number, and the like at the time of processing.

When generating the token (token ID), the token generation unit 402 transmits an affirmative response (token issue) to the check-in terminal 10. When failing to generate the token ID, the token generation unit 402 transmits a negative response (no token issue) to the check-in terminal 10.

When the token ID is successfully generated (issued), the token generation unit 402 delivers the generated token ID, boarding pass information, passport information, and face image (face image of the system user) to the database management unit 403.

The database management unit 403 is a unit (management unit) that manages various databases constructed in the server device 20.

The server device 20 includes a token ID information database and a business information database.

The token ID information database stores at least the token ID and the biometric information of the user in association with each other. FIG. 11 is a diagram illustrating an example of the token ID information database. Referring to FIG. 11, the token ID information database has fields that store the token ID, a registered face image, the feature amount, a token issue time, a token issue device name, and the like.

As described above, the token ID is an identifier that is temporarily issued. When the user finishes the procedure in the boarding gate device 14, the token ID is invalidated. That is, the token ID is not an identifier that is permanently used, but is a one-time ID having a valid period (life cycle).

The registered face image is a face image of a system user. For example, the registered face image may be a face image of the user captured by the check-in terminal 10, or may be a passport face image. The feature amount is a feature vector generated from the face image. The token issue time is a time when the server device 20 issues the token ID. The device name is a device name (check-in terminal 10) of an acquisition source of the registered face image that has triggered issuance of the token ID.

The business information database is a database that manages information (business information) necessary for boarding procedures of users. FIG. 12 is a diagram illustrating an example of the business information database. Referring to FIG. 12, the business information database has fields for storing the token ID, a passenger name, a departure place, a destination, an airline code, a flight number, an operation date, and the like. In addition to the above fields, the business information database may include fields for storing a seat number, a nationality, a passport number, a last name, a first name, a date of birth, a gender, and the like. The business information database stores business information necessary for predetermined business (procedure business performed at each touch point) for each token ID.

The information stored in the business information database is acquired from the boarding pass information and the passport information.

When acquiring the token ID from the token generation unit 402 (when the token ID is issued), the database management unit 403 adds a new entry to the two databases. The database management unit 403 sets a setting value in a field of each database. For example, the database management unit 403 generates a feature amount from the registered face image and registers the generated feature amount in the token ID information database. The database management unit 403 may set initial values (default values) for fields for which setting values cannot be set.

The authentication unit 404 is a unit that performs the biometric authentication. The authentication unit 404 processes the authentication request acquired from the terminal. The authentication unit 404 performs the biometric authentication using the biometric information of the person to be authenticated and biometric information of each of a plurality of users registered in advance in the token ID information database.

Specifically, the authentication unit 404 processes the authentication request from each of the plurality of terminals including the boarding gate device 14 with reference to the token ID information database. The authentication request includes biometric information of the person to be authenticated. The authentication unit 404 executes collation processing (one-to-N collation) using the biometric information included in the authentication request and the biometric information registered in the token ID information database.

The authentication unit 404 generates the feature amount from the face image acquired from the terminal (baggage checking machine 11, passenger passage system 12, gate device 13, boarding gate device 14). An existing technique can be used for the feature amount generation processing, and thus a detailed description thereof will be omitted. For example, the authentication unit 404 extracts eyes, a nose, a mouth, and the like as feature points from the face image. Thereafter, the authentication unit 404 calculates the position of each feature point and the distance between the feature points as feature amounts, and generates a feature vector including a plurality of feature amounts.

The authentication unit 404 sets the generated feature amount (feature vector) as the feature amount on the collation side and sets the feature amount stored in the token ID information database as the feature amount on the registration side.

The authentication unit 404 calculates similarity (score) between the feature amount on the collation side and each of the plurality of feature amounts on the registration side. A chi-square distance, a Euclidean distance, or the like can be used as the similarity. The similarity is lower as the distance is longer, and the similarity is higher as the distance is shorter.

The authentication unit 404 determines that the authentication is successful when there is a feature amount having similarity of a predetermined value or more with the feature amount of the collation target among the plurality of feature amounts (valid feature amounts) registered in the token ID information database.

When the authentication succeeds, the authentication unit 404 specifies the token ID corresponding to the feature amount having the highest similarity. The authentication unit 404 searches the business information database using the specified token ID as a key, and specifies a corresponding entry.

The authentication unit 404 transmits the authentication result to the terminal (responds to the authentication request).

When the authentication is successful, the authentication unit 404 transmits an affirmative response including the entry (token ID, business information) specified from the business information database and the face image (face image on the registration side) of the successful authentication person to the terminal. In this manner, the authentication unit 404 transmits the registered biometric information (registered face image) of the successful authentication person who has succeeded in the biometric authentication and the information regarding the flight of the successful authentication person to the terminal.

When the authentication fails, the authentication unit 404 transmits a negative response indicating the authentication failure to the terminal.

The storage unit 405 stores various types of information necessary for the operation of the server device 20. In the storage unit 405, the token ID information database and the business information database are constructed. The token ID information database is a first database that stores at least the biometric information of each of the plurality of users and the token ID issued to each of the plurality of users in association with each other. The business information database is a second database that stores at least the token ID issued to each of the plurality of users and the business information of each of the plurality of users in association with each other. The business information database stores at least the information regarding the flight as the business information.

[System Operation]

Figure 13:
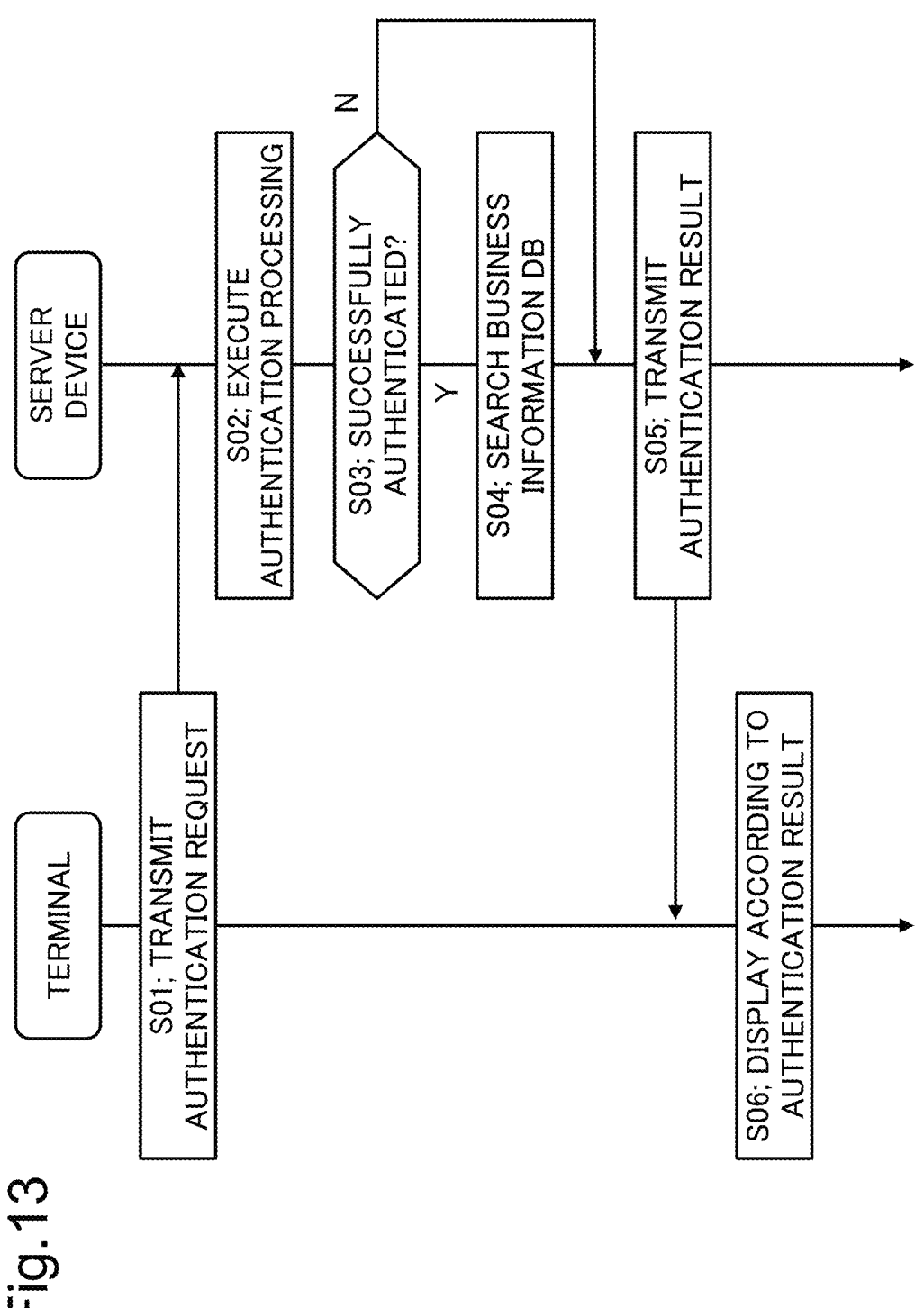
FIG. 13 is a sequence diagram illustrating an example of the operation of the boarding procedure system according to the first example embodiment.

Next, an operation of the boarding procedure system according to the first example embodiment will be described. FIG. 13 is a sequence diagram illustrating an example of the operation of the boarding procedure system according to the first example embodiment. An operation when the authentication processing of the user is executed will be described with reference to FIG. 13. Description of the operation related to the system registration will be omitted.

The terminal (any one of the baggage checking machine 11, the passenger passage system 12, the gate device 13, and the boarding gate device 14) acquires the face image of the user (person to be authenticated) and transmits the authentication request to the server device 20 (step S01).

The server device 20 generates the feature amount from the face image included in the authentication request, and executes the authentication processing using the token ID information database (step S02).

When the authentication succeeds (step S03: Yes branch), the server device 20 searches the business information database using the token ID obtained by the collation processing as a key (step S04).

When the authentication fails (step S03, No branch), the server device 20 executes the processing in and after step S05.

The server device 20 transmits the authentication result (authentication success, authentication failure) to the terminal (touch point) (step S05). When the authentication is successful, the server device 20 transmits a response including the content (token ID, business information) of the entry specified by the search in step S04 and the registered face image of the successful authentication person to the terminal.

The terminal performs display according to the authentication result acquired from the server device 20 (step S06).

When the response related to the authentication success is received, the terminal performs display as illustrated in FIG. 3, for example. That is, the terminal performs display including the biometric information of the successful authentication person and the information regarding the flight. When the response related to the authentication failure is received, the terminal performs the display as illustrated in FIG. 4, for example.

The terminal executes the boarding procedure of the user according to the authentication result. Description of the operation will be omitted. Each terminal may execute the allocated function.

As described above, in the boarding procedure system according to the first example embodiment, when the authentication of the person to be authenticated succeeds, the face image (the face image registered in the system by the check-in terminal 10) registered in advance and flight information (information of a destination, an airline, or the like) are presented to the user. The user (successful authentication person) confirms these pieces of information, and can recognize that the processing of the system is not normal when the information (face image of another person, flight information of another person) of another person is displayed. That is, the server device 20 and the terminal generate information that enables the user to detect the false authentication due to the occurrence of the different person acceptance, and present the information to the user.

As a result, even when a false authentication occurs, the problem, contradiction, and the like caused by the false authentication are resolved by the user notifying the staff or the like of the occurrence.

Second Example Embodiment

Next, a second example embodiment will be described in detail with reference to the drawings.

In the first example embodiment, the terminal simultaneously displays the registered face image of the successfully-authenticated person, the personal information of the successfully-authenticated person, and the flight information. By displaying the above information, even if another person is accepted, the face and the flight information of the person to be authenticated are displayed, so that the person to be authenticated can detect the occurrence of the different person acceptance. That is, in the first example embodiment, the occurrence detection of the different person acceptance is entrusted to the user.

In a second example embodiment, a case where an airport or airline staff or the like can detect the occurrence of the different person acceptance will be described.

Since the processing configuration of the server device 20 and the terminal according to the second example embodiment can be the same as that of the first example embodiment, the description thereof will be omitted.

Hereinafter, differences between the first and second example embodiments will be described.

Figure 14:
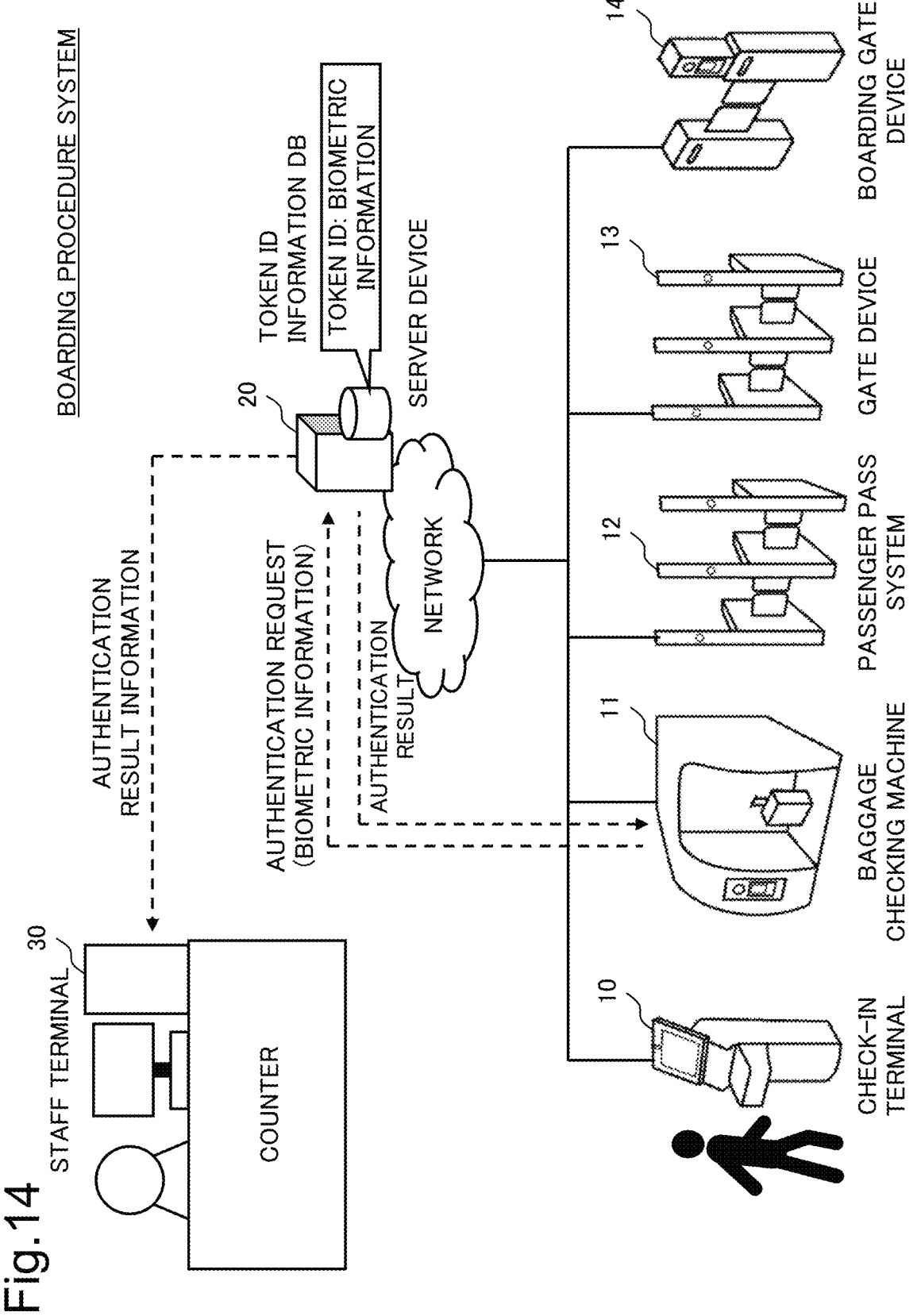
FIG. 14 is a diagram illustrating an example of a schematic configuration of a boarding procedure system according to a second example embodiment.

FIG. 14 is a diagram illustrating an example of a schematic configuration of a boarding procedure system according to the second example embodiment. Referring to FIG. 14, the boarding procedure system according to the second example embodiment includes a staff terminal 30.

The staff terminal 30 is a terminal used by a staff or the like of an airport or an airline. The boarding procedure system may include one staff terminal 30 or a plurality of staff terminals 30. In a case where a plurality of staff terminals 30 is included in the system, at least one staff terminal 30 may be installed at each procedure location (for example, the departure examination site). That is, the staff terminal 30 may be installed corresponding to each terminal used for boarding procedures.

The staff terminal 30 may be a stationary computer as illustrated in FIG. 14, or may be a portable terminal such as a mobile phone, a smartphone, a tablet, or a notebook computer. The staff terminal 30 may have any form and form as long as it is a terminal used by the staff.

The staff terminal 30 may include a display device such as a liquid crystal panel and an operation device such as a touch panel, and may have an information providing function and an information input function. The staff terminal 30 can be achieved by a commercially available computer or the like, and an internal processing configuration and the like are obvious to those skilled in the art, and description thereof will be omitted.

When the authentication of the person to be authenticated succeeds, the server device 20 transmits authentication result information to the staff terminal 30. The authentication result information includes the face image (acquired face image) of the person to be authenticated acquired by the terminal and the face image (face image registered in the token ID information database; registered face image) of a person determined to be the same person as the person to be authenticated by the biometric authentication.

Figure 15:
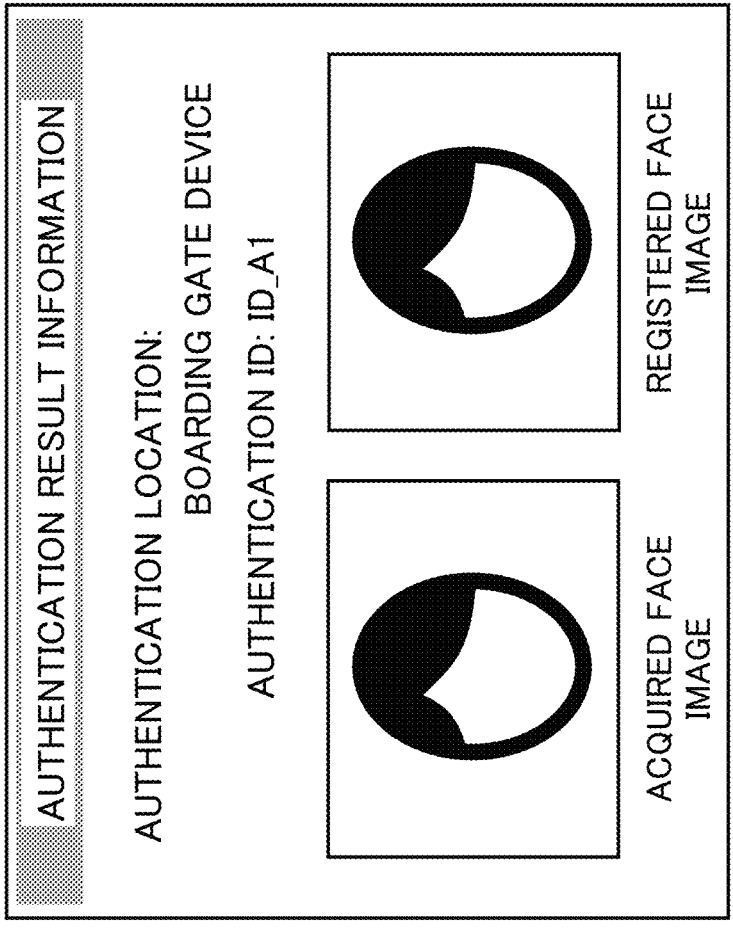
FIG. 15 is a diagram for explaining an operation of a staff terminal according to the second example embodiment.

In response to the reception of the authentication result information, the staff terminal 30 performs display as illustrated in FIG. 15. The staff checks the display on the staff terminal 30. The staff compares the two face images to determine whether the different person acceptance occurs. Specifically, in a case where it is determined that the two face images are the face images of the same person, it is determined that the different person acceptance has not occurred. When it is determined that the two face images are not the face images of the same person, it is determined that the different person acceptance has occurred.

When the different person acceptance does not occur, the staff does not take any special action. When the different person acceptance occurs, the staff corrects and revises the authentication result by the server device 20, relying on the authentication ID and the like. Specifically, the staff inputs the authentication ID to the server device 20, and identifies two parties involved in the different person acceptance. The staff corrects the token ID information database based on the name and the flight number of the party, or visits the party to inform the party of the occurrence of the false authentication and take necessary measures. The response at the time of occurrence of the different person acceptance varies depending on the situation of the terminal or the passenger (before or after boarding the passenger aircraft) at the time of occurrence of the different person acceptance, and uniform processing by the system is difficult. That is, it is assumed that the staff or the like respond flexibly when the different person acceptance occurs, and thus a more detailed description will be omitted. When the different person acceptance occurs, the staff may appropriately correct the inconvenience and contradiction caused by the false authentication.

When the biometric authentication succeeds, the authentication unit 404 generates an authentication ID that uniquely specifies the result of the biometric authentication. The authentication unit 404 generates the authentication ID by assigning a unique value each time the biometric authentication succeeds.

The authentication unit 404 stores the generated authentication ID and the information acquired from the authentication unit 404 in association with each other (see FIG. 16).

After generating the authentication ID, the authentication unit 404 generates authentication result information. Specifically, the authentication unit 404 generates authentication result information including the authentication ID, the terminal identifier, the acquired face image, and the registered face image. The authentication unit 404 transmits the generated authentication result information to the staff terminal 30.

Alternatively, the authentication unit 404 may generate authentication result information including personal information (name or the like) and flight information (flight number or the like) of the successful authentication person. The authentication unit 404 can acquire (read) the personal information and the like of the successful authentication person from the business information database using the token ID.

The authentication unit 404 may transmit the authentication result information to the staff terminal 30 when a predetermined condition is satisfied. For example, in a case where similarity between two images (acquired face image, registered face image) at the time of authentication success is smaller than a predetermined threshold, the server device 20 may transmit the authentication result information to the staff terminal 30. That is, in a case where the similarity between the two images is larger than the first threshold at which it is determined that the authentication has succeeded and smaller than a predetermined second threshold, the server device 20 may transmit the authentication result information to the staff terminal 30.

In this manner, the authentication unit 404 may execute threshold processing on the calculated similarity and determine whether to transmit the authentication result information to the staff terminal 30 according to the result. As a result, in a case where the accuracy (probability) of the authentication result is sufficiently high (in a case where the similarity between the images is equal to or more than the second threshold), the authentication result information is not transmitted from the server device 20 to the staff terminal 30. In other words, in a case where the biometric authentication has succeeded but the accuracy is not sufficient, the authentication result information is transmitted to the staff terminal 30.

By checking the authentication result information selected (filtered) by the server device 20, the staff can detect the occurrence of the different person acceptance with higher concentration.

Alternatively, the server device 20 may determine whether transmission of the authentication result information is necessary using a similarity (first similarity) having the largest value among the plurality of similarities calculated at the time of the authentication processing and a similarity (second similarity; the first similarity>the second similarity) having the second largest value among the plurality of similarities. Specifically, the server device 20 may transmit the authentication result information to the staff terminal 30 in a case where a difference between the first similarity and the second similarity is smaller than a predetermined threshold.

The fact that the difference between the first similarity and the second similarity is large indicates that a face of a person determined to be the second closest to the person to be authenticated does not resemble the face of the person to be authenticated (the person himself/herself). Meanwhile, the fact that the difference between the first similarity and the second similarity is small indicates that the face of the person who is determined to be the second closest to the person to be authenticated resembles the face of the person to be authenticated. For example, in a case where the person to be authenticated is a twin and both face images are registered, the difference between the similarity (first similarity) based on the face image of the person in question and the similarity (second similarity) based on another face image of the twin is reduced.

The server device 20 may determine whether the transmission of the authentication result information is necessary based on the difference in the similarity. Also in this case, the authentication unit 404 may execute threshold processing on the difference between the first similarity and the second similarity, and determine whether to transmit the authentication result information according to the result.

As described above, in the boarding procedure system according to the second example embodiment, when the authentication of the person to be authenticated succeeds, the server device 20 transmits the authentication result information including the acquired face image and the registered face image to the staff terminal 30. The staff terminal 30 provides the staff or the like with information capable of verifying whether there is any false authentication due to the different person acceptance. The staff compares the two face images to detect the occurrence of the false authentication. In the second example embodiment, since the staff skilled in the business monitors the occurrence of the false authentication, the occurrence of the different person acceptance is more reliably detected. Also in the second example embodiment, problems, inconsistencies, and the like caused by false authentication are solved.

Figure 17:
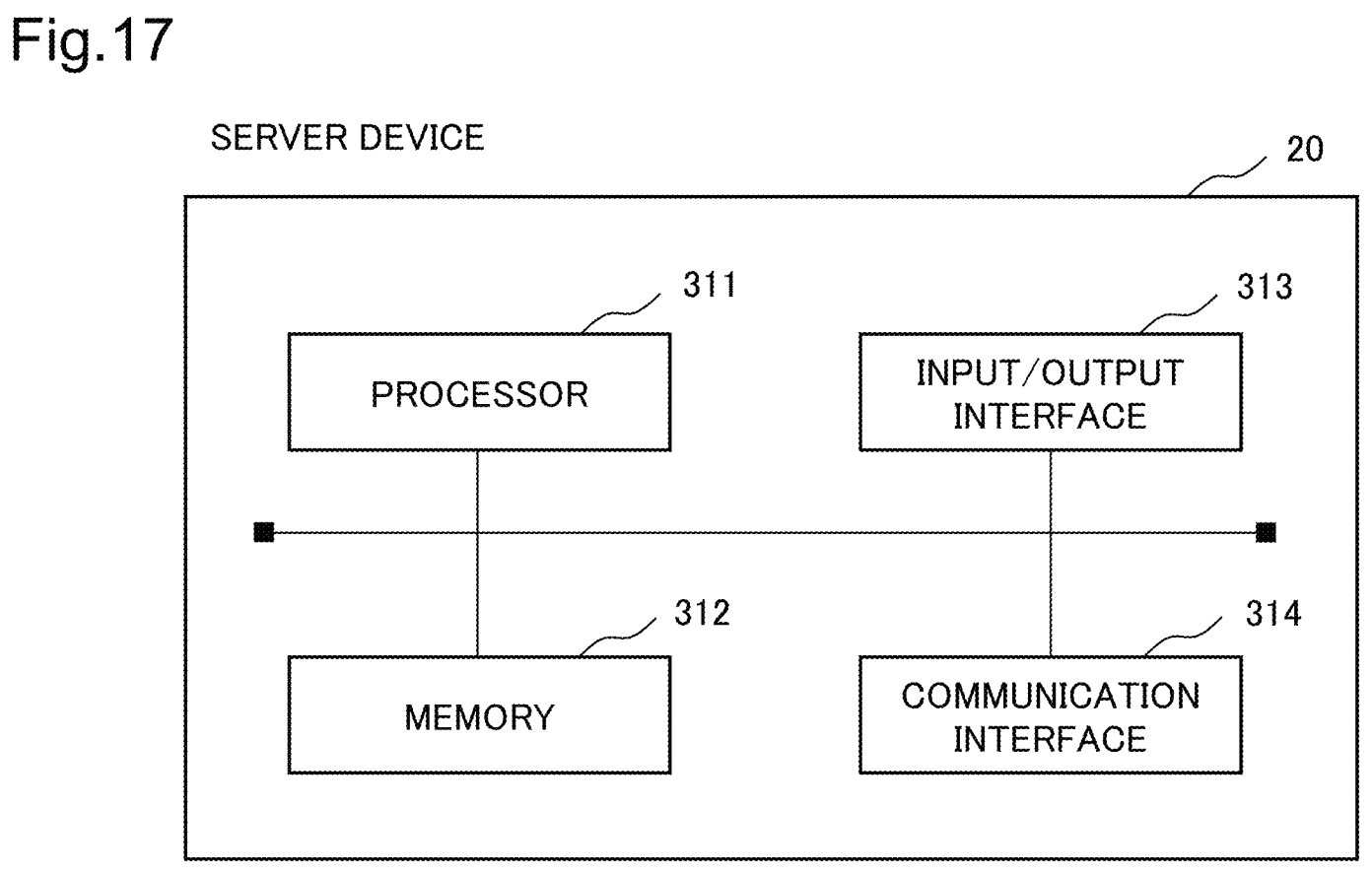

Next, hardware of each device constituting the boarding procedure system will be described. FIG. 17 is a diagram illustrating an example of a hardware configuration of the server device 20.

The server device 20 can be configured by an information processing device (so-called computer), and has the configuration illustrated in FIG. 17. For example, the server device 20 includes a processor 311, a memory 312, an input/output interface 313, a communication interface 314, and the like. The components such as the processor 311 are connected by an internal bus or the like and are configured to be able to communicate with each other.

However, the configuration illustrated in FIG. 17 is not intended to limit the hardware configuration of the server device 20. The server device 20 may include hardware (not illustrated) or may not include the input/output interface 313 as necessary. The number of processors 311 and the like included in the server device 20 is not limited to the example of FIG. 17, and for example, a plurality of processors 311 may be included in the server device 20.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 executes various programs including an operating system (OS; Operating System).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device or an input device (not illustrated). The display device is, for example, a liquid crystal display or the like. The input device is, for example, a device that receives a user operation such as a keyboard or a mouse.

The communication interface 314 is a circuit, a module, or the like that communicates with another device. For example, the communication interface 314 includes a network interface card (NIC) or the like.

The functions of the server device 20 are achieved by various processing modules. The processing module is achieved, for example, by the processor 311 executing a program stored in the memory 312. The program can be recorded in a computer-readable storage medium. The storage medium may be a non-transient medium such as a semiconductor memory, a hard disk, a magnetic recording medium, or an optical recording medium. That is, the present invention can also be embodied as a computer program product. The program can be downloaded via a network or updated using a storage medium storing the program. Furthermore, the processing module may be achieved by a semiconductor chip.

The check-in terminal 10, the boarding gate device 14, the staff terminal 30, and the like can also be configured by an information processing device similarly to the server device 20, and since there is no difference in the basic hardware configuration from the server device 20, the description thereof will be omitted. The check-in terminal 10 or the like may include a camera or the like.

The server device 20 is equipped with a computer, and the function of the server device 20 can be achieved by causing the computer to execute a program. The server device 20 executes the method for controlling the server device by the program.

[Modification]

The configuration, operation, and the like of the boarding procedure system described in the above example embodiment are merely examples, and are not intended to limit the configuration and the like of the system.

In the above example embodiment, it has been described that the system registration is performed after the check-in procedure of the user, but the system registration may be performed before the check-in procedure. In this case, since the boarding pass is not issued before the check-in procedure, the server device 20 may perform the system registration using the information of the airline ticket instead of the boarding pass.

In the above example embodiment, the case where the system registration (registration for achieving boarding procedure using biometric authentication) is performed by the check-in terminal 10 has been described. However, the system registration may be performed by a device or a terminal other than the check-in terminal 10. For example, a device dedicated to the system registration may be installed at an airport, or the system registration may be performed at a terminal (touch point) such as the baggage checking machine 11 or the passenger passage system 12.

In the above example embodiment, the case where a series of boarding procedures is performed by the biometric authentication has been described, but some procedures may be performed by biometric authentication. For example, in FIG. 2, the system registration may be performed in the baggage checking machine 11, and procedures (security inspection and the like) after baggage checking may be performed by the biometric authentication. In other words, some of the series of boarding procedures may be performed in a manned booth or the like.

In the above example embodiment, the case where the server device 20 includes two databases has been described. However, the token ID information database and the business information database constructed in the server device 20 may be constructed in a database server different from the server device 20. That is, the boarding procedure system may include various means (for example, token generation means) described in the above example embodiment.

In the above example embodiment, the case where the authentication request includes the face image has been described, but the authentication request may include a feature amount generated from the face image. In this case, the server device 20 may process the authentication request using the feature amount extracted from the authentication request and the feature amount registered in the token ID information database.

In the first example embodiment, the case where the server device 20 includes the registered face image in the response to the authentication request has been described. However, the server device 20 may transmit the registered face image to the terminal by a method different from the method for responding to the authentication request. For example, the server device 20 may transmit the authentication result information as described in the second example embodiment to the terminal.

The server device 20 according to the first example embodiment may include the registered face image or the like in the affirmative response to the authentication request in a case where a predetermined condition is satisfied. For example, as described in the second example embodiment, the server device 20 may include the registered face image or the like in the affirmative response according to the result of the threshold processing for the similarity calculated at the time of the authentication processing. In this case, when receiving the affirmative response including the registered face image, the terminal may output the display as illustrated in FIG. 3.

In the display that provides the authentication result to the successful authentication person, information regarding the seat of the successful authentication person may also be displayed. For example, a seat number of the successful authentication person, a seat class (first class, business class, and economy class), and the like may be displayed together with the registered face image. The person to be authenticated can detect the occurrence of the different person acceptance based on these pieces of information.

When performing the display as illustrated in FIG. 3, the terminal may generate a GUI including a button or the like for acquiring that the successful authentication person has visually recognized the display (see FIG. 18). That is, the terminal may acquire whether the successful authentication person has confirmed that no different person acceptance has occurred based on the displayed biometric information and information regarding the flight using the GUI. In response to the successful authentication person pressing the OK button, the terminal may proceed with the procedure of the successful authentication person. Alternatively, in response to the pressing of the OK button, the terminal may control the gate or the like so that the successful authentication person can pass. Alternatively, the terminal may acquire that the successful authentication person visually recognizes (confirms) the display content by a contactless input such as a voice or a gesture.

Figure 19:
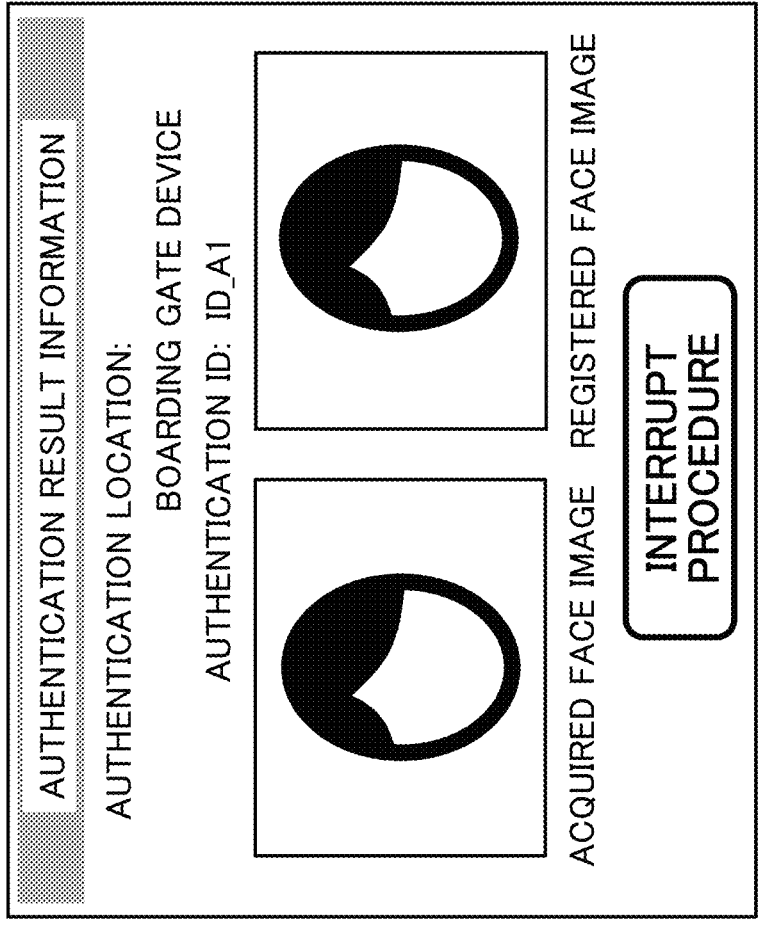
FIG. 19 is a diagram for explaining an operation of a staff terminal according to the modification of the present disclosure.

In the second example embodiment, the staff terminal 30 and the terminal may operate in cooperation. For example, the staff terminal 30 may control a gate included in the terminal. For example, the staff terminal 30 displays a GUI as illustrated in FIG. 19. The staff compares the two face images, and presses a procedure interruption button when determining that the different person acceptance occurs. In response to the pressing of the button, the staff terminal 30 issues a procedure interruption instruction to the terminal (boarding gate device 14 in the example of FIG. 19) for which the biometric authentication has been performed. The terminal (function implementation unit 305 of the terminal) that has received the instruction interrupts the procedure of the successful authentication person. For example, the terminal controls such that the successful authentication person cannot pass through the gate. The staff goes to the terminal that has interrupted the procedure and takes necessary measures.

As described above, the staff terminal 30 acquires, by the GUI, whether the staff determines that the different person acceptance occurs based on the biometric information acquired from the terminal and the registered biometric information of the successful authentication person. Furthermore, the staff terminal 30 may instruct the terminal to interrupt a procedure when it is determined by the staff that the different person acceptance occurs. In other words, the staff terminal 30 may control the terminal according to the operation of the staff (determination result of the different person acceptance by the staff or the like).

In a case where a predetermined condition is satisfied, the server device 20 (the authentication unit 404) may include an "alarm flag" in the affirmative response including the registered face image or the authentication result information. The alarm flag is information for notifying the terminal or the staff terminal 30 that the predetermined condition is satisfied. The alarm flag is set when requesting the successful authentication person or the staff to carefully consider the authentication result. For example, the server device 20 sets the alarm flag according to the result of the threshold processing for the similarity described in the second example embodiment. More specifically, in a case where it is assumed that the authentication has succeeded but the accuracy thereof is low, the server device 20 sets the alarm flag.

The terminal or the staff terminal 30 may change the mode of the display provided to the successful authentication person or the staff depending on whether the alarm flag is set. For example, the terminal may change the mode of the display (for example, the display illustrated in FIG. 3) including the biometric information of the successful authentication person and the information regarding the flight according to whether the predetermined condition is satisfied.

For example, when the alarm flag is set, the terminal or the staff terminal 30 may perform display (highlight display) in which colors that attract attention are frequently used than when the flag is not set, or may blink the entire or a part of the screen. Alternatively, the terminal or the like may prompt, by using a voice, to carefully confirm the registered face image.

In the above description, the case where the authentication result information is transmitted to the staff terminal 30 when the predetermined condition is satisfied has been described. The predetermined condition described above is an example, and the necessity of transmission of the authentication result information may be determined by other conditions. For example, the necessity of transmission of the authentication result information may be determined based on a seat grade (seat class; highest-level passenger seat, upper-level seat, and ordinary passenger seat) or the travel history of the successful authentication person. For example, in a case where the seat class of the successful authentication person is the first class, the authentication result information may be transmitted to the staff terminal 30. In this case, the staff can carefully monitor occurrence of false authentication concerning first class passengers (passengers who the airline or the like wants to avoid trouble).

Alternatively, the server device 20 may transmit the affirmative response including the authentication result information and the registered face image based on an index or the like different from the similarity between the face images based on the feature amount generated from the face image. In the biometric authentication, the occurrence of the false authentication (different person acceptance) is caused by the similarity of the "face" on the collation side and the registration side. More precisely, when the positions of the eyes and nose and the distance between these feature points are almost the same, false authentication (different person acceptance) may occur even for the faces of other people. Here, in the boarding procedure system at the airport, the registered face image is input to the server device 20 at the time of check in, and then the terminal (the boarding gate device 14 or the like) requests the server device 20 for biometric authentication in a relatively short time. It is difficult to assume that a hairstyle, presence or absence of wearing glasses, clothes, and the like of the person to be authenticated change in such a short period. The server device 20 may determine whether to transmit the authentication result information using such characteristics and features of the biometric authentication at the airport.

More specifically, the server device 20 (authentication unit 404) calculates the similarity between the two images by a method different from the method using the feature amount. For example, when hairstyles of persons appearing in the two face images are different, the server device 20 sets a low value for the similarity. Alternatively, the server device 20 sets a low value for the similarity when the glasses are shown in one face image and the glasses are not shown in the other face image. Alternatively, when the clothes of the persons appearing in the two face images are different, the server device 20 sets a low value for the similarity. The server device may transmit the authentication result information to the staff terminal in a case where the similarity calculated by the method as described above is lower than a predetermined threshold. That is, the server device may determine whether to transmit the authentication result information based on the similarity between the images calculated by a method different from the similarity based on the feature amount. Similarly, the server device 20 may transmit the affirmative response including the registered face image to the terminal based on the similarity between the images calculated by a method different from the similarity based on the feature amount.

Regarding the hairstyle similarity determination, the server device may compare the areas of the regions in the upper part of the face, or may use the shapes of the regions. The server device 20 may determine whether to wear the glasses using a method such as template matching. Regarding the clothing identity determination, the server device 20 may use a frequency analysis result of a region other than the face area. The server device may determine the identity of the clothing according to whether a pattern and texture of an area other than the face area are different.

In the second example embodiment, the case where the authentication result information is transmitted to the staff terminal 30 has been described, but the information may be transmitted to the terminal. The terminal may perform display using the registered face image included in the response to the authentication request and display using the registered face image included in the authentication result information regarding different display devices. For example, the former display may be performed on a main display that can be visually recognized by the person to be authenticated, and the latter display may be performed on a sub display that can be visually recognized by the staff (a staff waiting near the terminal).

In the above example embodiment, the case where the staff detects the occurrence of the different person acceptance using the staff terminal 30 has been described. However, the occurrence detection of the different person acceptance may be performed using a learning model generated by machine learning. Specifically, the system administrator or the like collects data (acquired face image, registered face image) at the time of occurrence of a large number of different person acceptances. The system administrator or the like assigns a label regarding authentication failure to the collected data to generate teacher data. The system administrator or the like inputs the teacher data to the learning device and generates a learning model (classification model). The learning model is implemented in a computer. The computer inputs the two face images acquired from the server device 20 to the learning model and outputs a determination result (occurrence and non-occurrence of the different person acceptance). The staff or the like may take necessary action according to the result determined by the computer. Any algorithm such as a support vector machine, boosting, or a neural network can be used to generate the learning model. A known technique can be used as the algorithm such as the support vector machine, and thus the description thereof will be omitted.

In the above example embodiment, the face image and the feature amount generated from the face image are treated as the "biometric information", and the operation of the system and the like have been described. However, other information may be used as the "biometric information" instead of the face image or the like. For example, in a case where voiceprint authentication is used, voiceprint information (voice data) registered in advance may be reproduced, and flight information and the like may be displayed.

In a case where the biometric information other than the face image is used, the biometric information on the registration side may not be displayed. For example, the personal information (name), flight information (destination, or the like), and the like of the person to be authenticated may be displayed on the terminal. When these pieces of information are different from the user's own information, the user can detect the false authentication.

The server device 20 may notify the terminal or the staff terminal 30 of the similarity (similarity of successful authentication persons) used for the authentication processing. The staff terminal 30 or the like may provide the similarity to the staff or the like. The staff can take measures such as more carefully checking the two face images according to the presented similarity.

A form of data transmission and reception between the check-in terminal 10 and the like and the server device 20 is not particularly limited, but data transmitted and received between these devices may be encrypted. The boarding pass information and the passport information include personal information, and in order to appropriately protect the personal information, it is desirable that encrypted data be transmitted and received.

In the flow chart (flowchart and sequence diagram) used in the above description, a plurality of steps (processes) are described in order, but the execution order of the steps executed in the example embodiment is not limited to the described order. In the example embodiment, for example, the order of the illustrated steps can be changed within a range in which there is no problem in terms of content, such as executing each process in parallel.

The above example embodiments have been described in detail in order to facilitate understanding of the present disclosure, and it is not intended that all the configurations described above are necessary. In a case where a plurality of example embodiments has been described, each example embodiment may be used alone or in combination. For example, a part of the configuration of the example embodiment can be replaced with the configuration of another example embodiment, or the configuration of another example embodiment can be added to the configuration of the example embodiment. Furthermore, it is possible to add, delete, and replace other configurations for a part of the configuration of the example embodiment.

Although the industrial applicability of the present invention is apparent from the above description, the present invention is suitably applicable to the boarding procedure system at an airport or the like. However, the application destination of the present disclosure is not limited to the airport procedure, and the present disclosure can be applied to a system requiring a plurality of procedures. For example, the present disclosure can also be applied to entrance/exit control of an event venue or the like. For example, the server device 20 may analyze authentication history in the event venue and notify the event promoter or the like of a result strongly suspected of false authentication.

Some or all of the above example embodiments may be described as the following supplementary notes, but are not limited to the following.

Supplementary Note 1

A server device including:

an acquisition unit configured to acquire biometric information of a person to be authenticated from a terminal; and an authentication unit configured to perform biometric authentication using the biometric information of the person to be authenticated and biometric information of each of a plurality of users registered in advance, wherein the authentication unit transmits authentication result information including the biometric information acquired from the terminal and registered biometric information of a successful authentication person who has succeeded in the biometric authentication to a staff terminal used by a staff when a predetermined condition is satisfied.

Supplementary Note 2

The server device according to Supplementary Note 1, wherein the authentication unit calculates a similarity between the biometric information of the person to be authenticated and the biometric information of each of the plurality of users registered in advance, and in a case where a similarity having a largest value among a plurality of the calculated similarities is larger than a first threshold and smaller than a second threshold, transmits the authentication result information to the staff terminal.

Supplementary Note 3

The server device according to Supplementary Note 1, wherein the authentication unit calculates a similarity between the biometric information of the person to be authenticated and the biometric information of each of the plurality of users registered in advance, calculates a difference between a first similarity having a largest value and a second similarity having a second largest value among a plurality of the calculated similarities, and in a case where the calculated difference is smaller than a predetermined threshold, transmits the authentication result information to the staff terminal.

Supplementary Note 4

The server device according to Supplementary Note 1, wherein the authentication unit determines whether to transmit the authentication result information to the staff terminal based on a seat grade of the successful authentication person.

Supplementary Note 5

The server device according to Supplementary Note 4, wherein the authentication unit transmits the authentication result information to the staff terminal when the seat grade of the successful authentication person is a highest rank guest seat.

Supplementary Note 6

The server device according to any one of Supplementary Notes 1 to 5, further including a database configured to store the biometric information of each of the plurality of users.

Supplementary Note 7

The server device according to any one of Supplementary Notes 1 to 6, wherein the biometric information is a face image or a feature amount extracted from the face image.

Supplementary Note 8

The server device according to any one of Supplementary Notes 1 to 7, wherein the authentication unit transmits the authentication result information to the terminal instead of the staff terminal.

Supplementary Note 9

A system including:

a terminal;

a staff terminal used by a staff; and a server device connected to the terminal and the staff terminal, wherein the server device includes:

an acquisition unit configured to acquire biometric information of a person to be authenticated from the terminal; and an authentication unit configured to perform biometric authentication using the biometric information of the person to be authenticated and biometric information of each of a plurality of users registered in advance, and the authentication unit transmits authentication result information including the biometric information acquired from the terminal and registered biometric information of a successful authentication person who has succeeded in the biometric authentication to the staff terminal when a predetermined condition is satisfied.

Supplementary Note 10

The system according to Supplementary Note 9, wherein the staff terminal performs display including the biometric information acquired from the terminal and the registered biometric information of the successful authentication person.

Supplementary Note 11

The system according to Supplementary Note 10, wherein the staff terminal acquires whether the staff determines that a different person acceptance has occurred based on the biometric information acquired from the terminal and the registered biometric information of the successful authentication person.

Supplementary Note 12

The system according to Supplementary Note 11, wherein when it is determined that the different person acceptance has occurred, the staff terminal instructs the terminal to interrupt a procedure.

Supplementary Note 13

A method for controlling a server device, including:

in the server device, acquiring biometric information of a person to be authenticated from a terminal;

performing biometric authentication using the biometric information of the person to be authenticated and biometric information of each of a plurality of users registered in advance; and transmitting authentication result information including the biometric information acquired from the terminal and registered biometric information of a successful authentication person who has succeeded in the biometric authentication to a staff terminal used by a staff when a predetermined condition is satisfied.

Supplementary Note 14

A computer-readable storage medium storing a program for causing a computer mounted on a server device to execute:

acquiring biometric information of a person to be authenticated from a terminal;

performing biometric authentication using the biometric information of the person to be authenticated and biometric information of each of a plurality of users registered in advance; and transmitting authentication result information including the biometric information acquired from the terminal and registered biometric information of a successful authentication person who has succeeded in the biometric authentication to a staff terminal used by a staff when a predetermined condition is satisfied.

The disclosures of the cited prior art documents are incorporated herein by reference. Although the example embodiments of the present invention have been described above, the present invention is not limited to these example embodiments. It will be understood by those skilled in the art that these example embodiments are exemplary only and that various variations are possible without departing from the scope and spirit of the invention. That is, it goes without saying that the present invention includes various modifications and corrections that can be made by those skilled in the art in accordance with the entire disclosure including the claims and the technical idea.

REFERENCE SIGNS LIST 10 check-in terminal
11 baggage checking machine
12 passenger passage system
13 gate device
14 boarding gate device
20, 100 server device
30 staff terminal
101 acquisition unit
102 authentication unit
201, 301, 401 communication control unit
202 system registration unit
203 token issue request unit
204, 304 message output unit
205 check-in execution unit
206, 306, 405 storage unit
211 boarding pass information acquisition unit
212 passport information acquisition unit
213, 302 biometric information acquisition unit
303 authentication request unit
311 processor
312 memory
313 input/output interface
314 communication interface
402 token generation unit
403 database management unit
404 authentication unit

What is claimed is:

1. A server device comprising:
at least one processor configured to:
acquire facial information of a person to be authenticated from a terminal;
perform a facial authentication using the facial information of the person to be authenticated and facial information of each of a plurality of users registered in advance;
determine whether the facial authentication is successful, wherein authentication result information of the facial authentication includes the facial information acquired from the terminal and registered facial information of a successful authentication person, the successful authentication person having succeeded in the facial authentication;
based on (i) the facial authentication being successful and (ii) at least one predetermined condition being satisfied, the at least one predetermined condition comprising a condition that is satisfied based on a seat grade corresponding to a predetermined class from among a plurality of classes, transmit the authentication result information to the terminal or a staff terminal used by a staff.

2. The server device according to claim 1, wherein the at least one processor calculates a similarity between the facial information of the person to be authenticated and the facial information of each of the plurality of users registered in advance, and
the at least one predetermined condition further comprises a condition that is satisfied in a case where a similarity having a largest value among a plurality of the calculated similarities is larger than a first threshold and smaller than a second threshold.

3. The server device according to claim 1, wherein the at least one processor
calculates a similarity between the facial information of the person to be authenticated and the facial information of each of the plurality of users registered in advance,
calculates a difference between a first similarity having a largest value and a second similarity having a second largest value among a plurality of the calculated similarities, and
the at least one predetermined condition further comprises a condition that is satisfied in a case where the calculated difference is smaller than a predetermined threshold.

4. The server device according to claim 1, wherein the at least one processor transmits the authentication result information to the staff terminal when the seat grade of the successful authentication person is a highest rank guest seat.

5. The server device according to claim 1, further comprising a database configured to store the facial information of each of the plurality of users.

6. The server device according to claim 1, wherein the facial information is a face image or a feature amount extracted from the face image.

7. The server device according to claim 1, wherein the at least one processor transmits the authentication result information to the terminal.

8. A system comprising:
a terminal;
a staff terminal used by a staff; and
a server device according to claim 1, the server device being connected to the terminal and the staff terminal.

9. The system according to claim 8, wherein the staff terminal performs display including the facial information acquired from the terminal and the registered facial information of the successful authentication person.

10. The system according to claim 9, wherein the staff terminal acquires whether the staff determines that a different person acceptance has occurred based on the facial information acquired from the terminal and the registered facial information of the successful authentication person.

11. The system according to claim 10, wherein when it is determined that the different person acceptance has occurred, the staff terminal instructs the terminal to interrupt a procedure.

12. A method for controlling a server device, comprising:
acquiring facial information of a person to be authenticated from a terminal;
performing a facial authentication using the facial information of the person to be authenticated and facial information of each of a plurality of users registered in advance;
determining whether the facial authentication is successful, wherein authentication result information of the facial authentication includes the facial information acquired from the terminal and registered facial information of a successful authentication person, the successful authentication person having succeeded in the facial authentication; and based on (i) the facial authentication being successful and (ii) at least one predetermined condition being satisfied, the at least one predetermined condition comprising a condition that is satisfied based on a seat grade corresponding to a predetermined class from among a plurality of classes, transmitting the authentication result information to the terminal or a staff terminal used by a staff.

13. A non-transitory computer-readable storage medium storing a program for causing a computer mounted on a server device to execute:

acquiring facial information of a person to be authenticated from a terminal;

performing a facial authentication using the facial information of the person to be authenticated and facial information of each of a plurality of users registered in advance;

determining whether the facial authentication is successful, wherein authentication result information of the facial authentication includes the facial information acquired from the terminal and registered facial information of a successful authentication person, the successful authentication person having succeeded in the facial authentication; and based on (i) the facial authentication being successful and (ii) at least one predetermined condition being satisfied, the at least one predetermined condition comprising a condition that is satisfied based on a seat grade corresponding to a predetermined class from among a plurality of classes, transmitting the authentication result information to the terminal or a staff terminal used by a staff.

14. The server device according to claim 1, wherein the facial information acquired from the terminal is a face image acquired from the terminal, wherein the registered facial information of the successful authentication person is a registered face image of the successful authentication person, and wherein the authentication result information is for displaying the face image acquired from the terminal and the registered face image of the successful authentication person on a single screen of the staff terminal.

15. The method according to claim 12, wherein the facial information acquired from the terminal is a face image acquired from the terminal, wherein the registered facial information of the successful authentication person is a registered face image of the successful authentication person, and wherein the authentication result information is for displaying the face image acquired from the terminal and the registered face image of the successful authentication person on a single screen of the staff terminal.

16. The non-transitory computer-readable storage medium according to claim 13, wherein the facial information acquired from the terminal is a face image acquired from the terminal, wherein the registered facial information of the successful authentication person is a registered face image of the successful authentication person, and wherein the authentication result information is for displaying the face image acquired from the terminal and the registered face image of the successful authentication person on a single screen of the staff terminal.

* * * * *